United States Patent
Arora et al.

(10) Patent No.: US 10,365,094 B2
(45) Date of Patent: Jul. 30, 2019

(54) OPTICAL DEVICE AND METHOD FOR WHEEL ALIGNMENT

(71) Applicants: Pooja Arora, New Delhi (IN); Mannu Arora, New Delhi (IN)

(72) Inventors: Mannu Arora, New Delhi (IN); Melvyn Smith, Bristol (GB); Lyndon Smith, Bristol (GB); Gary Atkinson, Bristol (GB); Abdul Farooq, Bristol (GB); Jinuai Sun, Bristol (GB); Maurya Shah, Ahmedabad (IN); Indivar Arora, New Delhi (IN); Naveen Arora, New Delhi (IN)

( * ) Notice: Subject to any disclaimer, the term of this patent is extended or adjusted under 35 U.S.C. 154(b) by 48 days.

(21) Appl. No.: 15/031,234

(22) PCT Filed: Oct. 22, 2014

(86) PCT No.: PCT/IB2014/002191
§ 371 (c)(1),
(2) Date: Apr. 21, 2016

(87) PCT Pub. No.: WO2015/059550
PCT Pub. Date: Apr. 30, 2015

(65) Prior Publication Data
US 2016/0265907 A1    Sep. 15, 2016

(30) Foreign Application Priority Data
Oct. 22, 2013   (IN) .............................. 3134/DEL/2013

(51) Int. Cl.
*G01B 11/275*  (2006.01)
*G06K 9/00*    (2006.01)
*G06K 9/36*    (2006.01)
*H04N 5/225*   (2006.01)
(Continued)

(52) U.S. Cl.
CPC ...... *G01B 11/2755* (2013.01); *G06K 9/00624* (2013.01); *G06K 9/36* (2013.01); *H04N 5/2256* (2013.01); *B62D 17/00* (2013.01); *G01B 11/255* (2013.01); *G01B 2210/14* (2013.01); *G01B 2210/26* (2013.01); *G01B 2210/286* (2013.01); *G06K 2009/363* (2013.01)

(58) Field of Classification Search
CPC .............. G01B 11/2755; G01B 11/255; G01B 2210/14; G01B 2210/26; G01B 2210/286; G06K 9/00624; G06K 9/36; G06K 2009/363; H04N 5/2256; B62D 17/00
See application file for complete search history.

(56) References Cited

U.S. PATENT DOCUMENTS

2003/0131485 A1 *  7/2003  Jahn ..................... G01B 11/275 33/193
2005/0068522 A1 *  3/2005  Dorrance ........... G01B 11/2755 356/139.09

(Continued)

*Primary Examiner* — Hung Dang
*Assistant Examiner* — Sunghyoun Park

(57) ABSTRACT

A method for aligning wheels of a vehicle is described herein. In an implementation, a plurality of images of a wheel of the vehicle is captured. The plurality of images comprises a LED image of the wheel, a laser image of the wheel, and a control image of the wheel. The method further comprises identifying, automatically, a rim coupled to the wheel based on the plurality of images. Further, the wheel is aligned based on the identified rim.

8 Claims, 42 Drawing Sheets

(51) Int. Cl.
*G01B 11/255* (2006.01)
*B62D 17/00* (2006.01)

(56) References Cited

U.S. PATENT DOCUMENTS

| | | | |
|---|---|---|---|
| 2005/0096807 A1* | 5/2005 | Murray | G01B 11/272 33/288 |
| 2006/0274303 A1* | 12/2006 | Jackson | G01B 11/2755 356/139.09 |
| 2007/0124949 A1* | 6/2007 | Burns, Jr. | G01B 11/2509 33/288 |
| 2008/0007722 A1* | 1/2008 | Golab | G01B 11/2545 356/139.09 |
| 2008/0148581 A1* | 6/2008 | Boni | G01B 11/2755 33/288 |
| 2009/0267784 A1* | 10/2009 | Braghiroli | G01B 11/002 340/686.1 |
| 2011/0085181 A1* | 4/2011 | Muhle | G01B 11/25 356/615 |

* cited by examiner

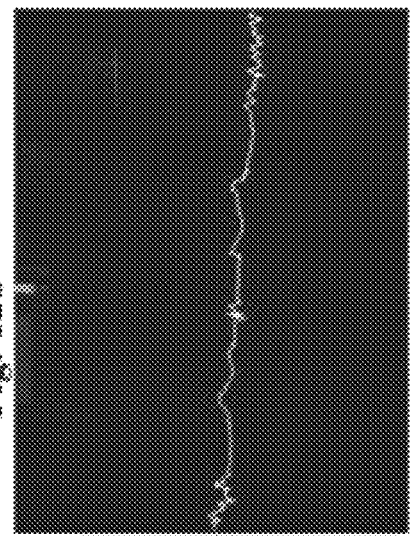
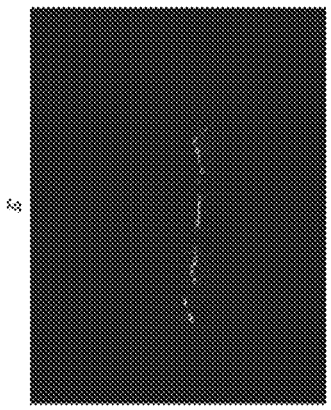
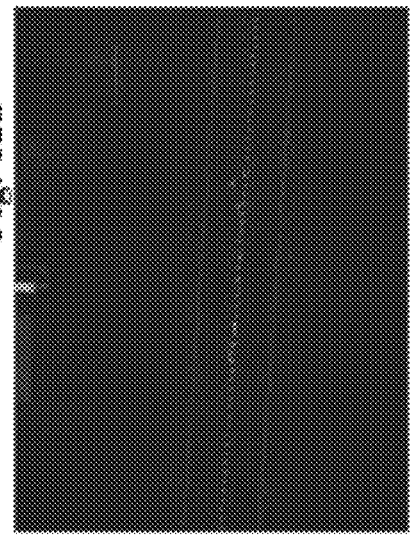
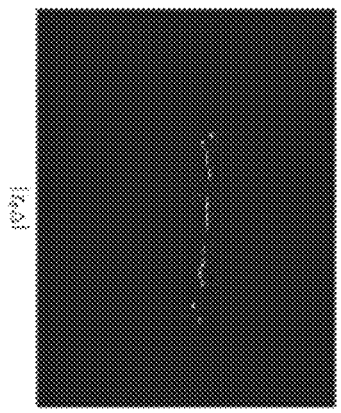

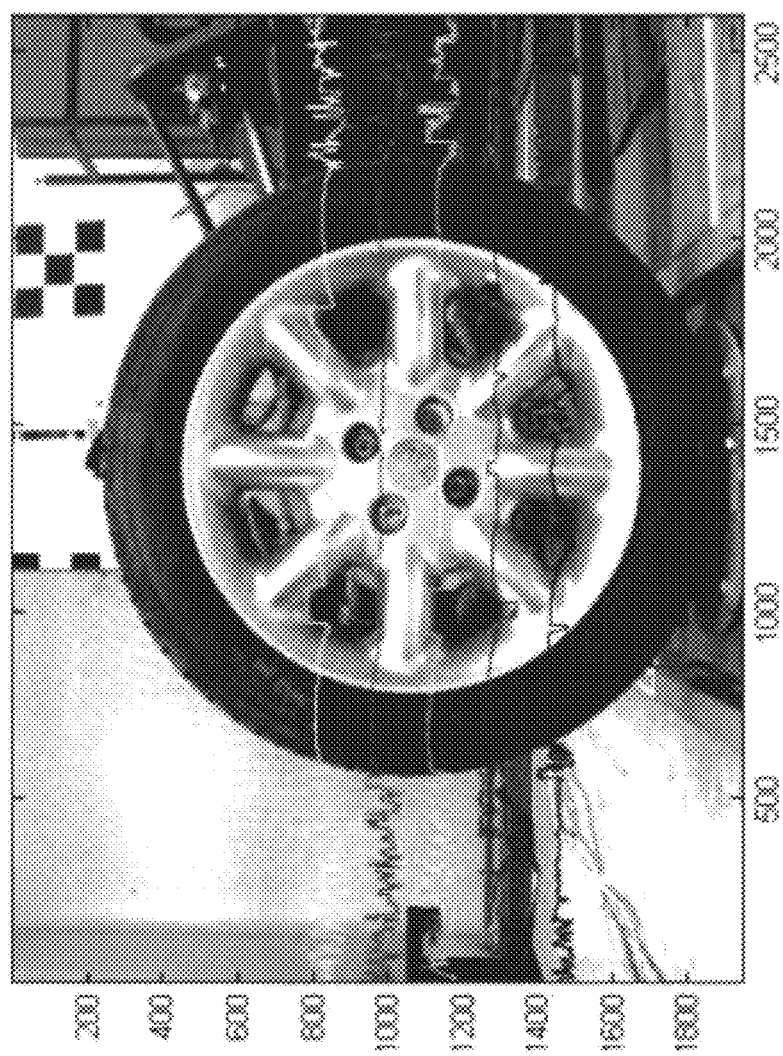

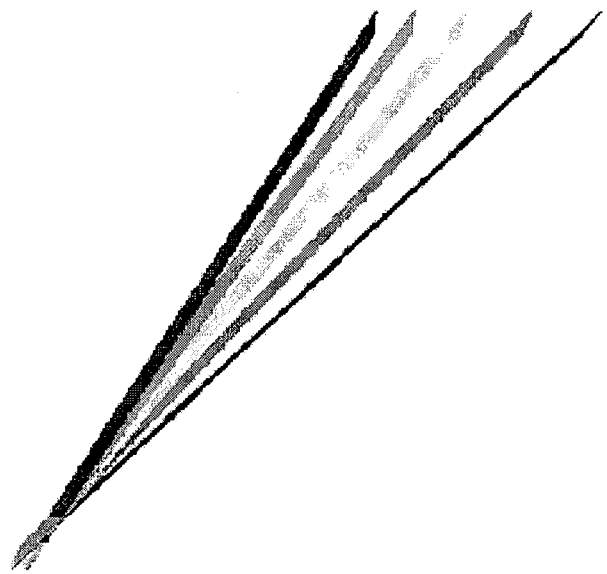
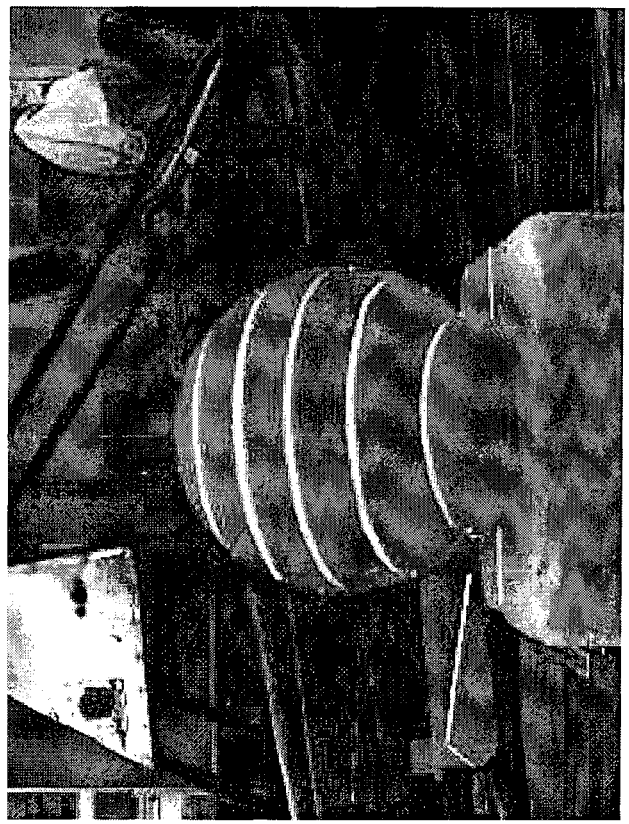
Fig. 21

OPTICAL DEVICE AND METHOD FOR WHEEL ALIGNMENT

TECHNICAL FIELD

The present subject matter relates to a system to determine alignment of wheels of a vehicle.

BACKGROUND

Alignment of wheels in a vehicle influences cruising characteristics and drivability of the vehicle and are, therefore, important from the viewpoints of riding comfort as well as safety to the passengers. In addition, if the wheels of the vehicle are out of alignment with each other, it can result in excessive or uneven wear of the tires aggravating the handling and stability of the vehicle, and adding to cost of maintenance of the vehicle. Accordingly, the wheels are periodically checked to determine whether they are in alignment and are to be adjusted or not. Usually, the wheels are provided in the vehicle in such a way that alignment can be adjusted even after assembly of the wheels and may not involve dismounting of the wheels.

Conventional techniques for alignment can be classified into two main categories—one involving contact of alignment detection equipment with the wheels for determining the alignment of the wheels and the being contactless. In the latter case, the alignment detection equipment usually includes two or more image capturing devices provided at each wheel. The images captures for each wheel are processed and compared to a standard image to determine whether the wheels are aligned or not.

BRIEF DESCRIPTION OF THE DRAWINGS

FIGS. 12a and 12b illustrate a Laplacian for image of the laser line and energy functional for the laser line, respectively, in accordance with an embodiment of the present subject matter.

FIG. 13a and FIG. 13b illustrate intensity profiles taken perpendicular to the Radon line and final estimate of the laser line, in accordance with an embodiment of the present subject matter.

FIG. 14 illustrates a capture of multiple laser lines in an image of the wheel, in accordance with an embodiment of the present subject matter.

FIG. 21 illustrates laser planes incident on a sphere for calibration of the image capturing system, in accordance with an embodiment of the present subject matter.

DETAILED DESCRIPTION

Figure 1A:
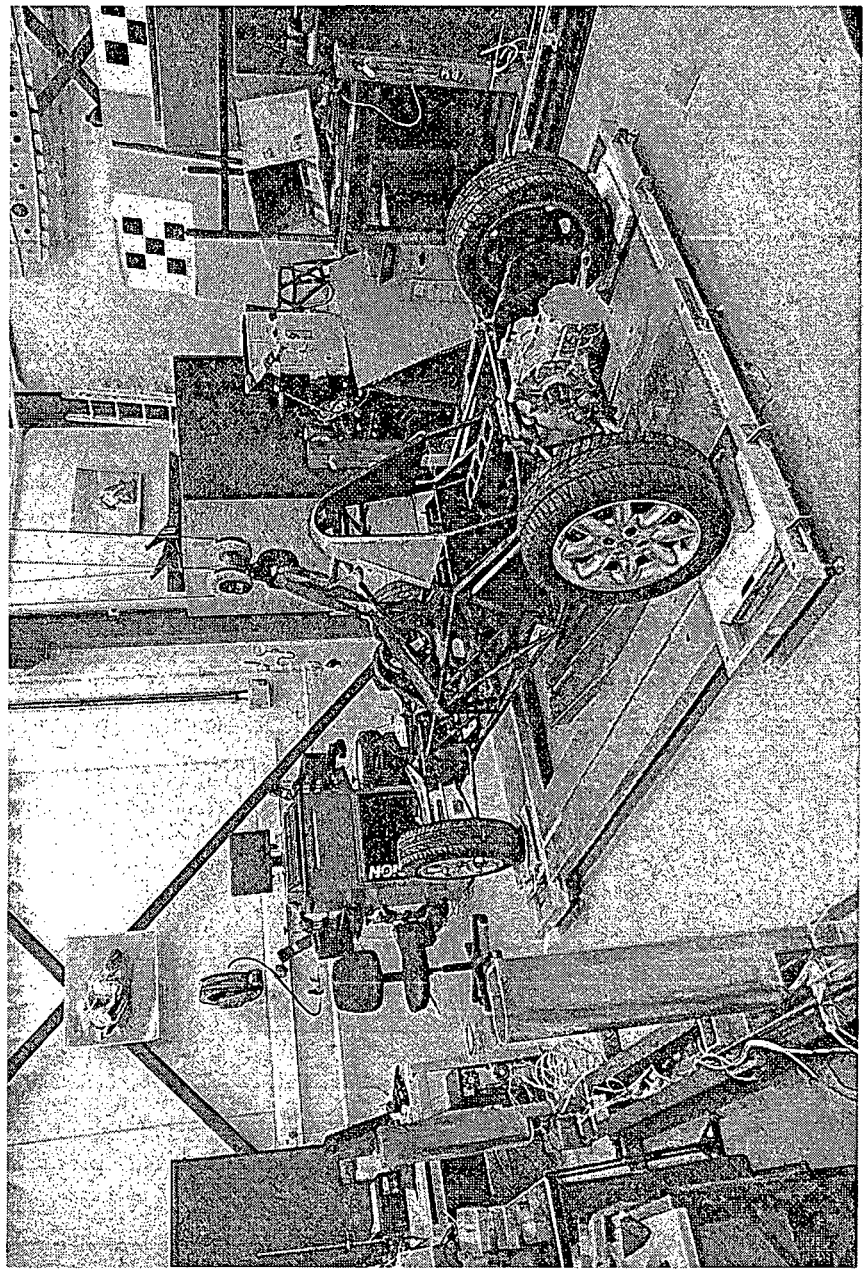
FIG. 1a illustrates a setup of a wheel alignment apparatus 100, in accordance with an embodiment of the present subject matter.

Conventional techniques for wheel alignment can involve contact with the wheels for alignment or contact-less detection of alignment. In the latter case, the conventional systems for wheel alignment employ use of optical techniques for detecting a position and orientation of the wheel to determine whether the wheel is in alignment or not. For example, in one conventional technique, a light source, such as a light emitting diode (LED), illuminates the wheel and a camera captures the image of the illuminated wheel. Further, the image is used to determine axle geometry of the wheel and to ascertain wheel alignment.

In another conventional technique, a single laser is incident on the wheel intermittently and an image of the wheel is captured each time the laser is incident on the wheel. Based on triangulation technique, an orientation of the wheel is determined from the images. In another similar conventional technique, a plurality of laser lines is incident on the wheel and images of the wheel are captured. In such a technique, one laser line from the plurality of laser lines is faded out and the image is captured, and this is repeated to capture a number of images each with a different line faded out from rest of laser lines. Further, the alignment of the wheel is determined from the images using triangulation technique. However, such conventional techniques involve capturing a large number of images of the wheel which incurs large amount of resources for storing and processing the images. In addition, capturing such a large number of images for wheel alignment, with fading out one laser line each time, can be substantially time consuming.

The present subject matter describes systems and methods for aligning wheels of a vehicle. According to an aspect, a plurality of images of a wheel of the vehicle is captured. Thereafter, based on at least one of the images, a rim coupled to the wheel is automatically identified. As will be understood, since the rim is identified based on the images, and not manually, the same is referred to as being automatically identified. Subsequently, the wheel is aligned based on the identified rim.

In an implementation, the plurality of images comprises a light emitting diode (LED) image of the wheel, a laser image wheel, and a control image of the wheel. The LED image may be understood as an image of the wheel captured using an LED light source. The laser image may be understood as an image of the wheel captured using a laser source, and the control image may be understood as an image of the wheel captured using ambient light. Based on the captured images, a rim identification process is performed for identifying the rim.

In the rim identification process, a corrected LED image may be obtained by processing the LED image and the control image using conventional background subtraction techniques. Similarly, a corrected laser image may be obtained based on the laser image and the control image using the conventional background subtraction techniques.

Upon obtaining the corrected LED image and the corrected laser image, an initial rim estimate image and a laser line image may be obtained. In an example, the initial rim estimate image may be obtained by processing the corrected LED image. For instance, the corrected LED image may be processed using techniques such as, canny edge detection technique, Hough transform and Gaussian smoothing technique for obtaining the initial rim estimate image. Simultaneously, the corrected laser image is processed to obtain the laser line image. In an example, the corrected laser image may be processed using techniques such as Laplace transform, radon transform, and energy function.

In an example, the initial rim estimate image and the laser line image may be processed for obtaining a rim estimate image. Thereafter, one or more points of interests are identified in the rim estimate image for aligning the wheel based on the rim. For example, the initial rim estimate image and the laser line image may be combined using known techniques, such as Nedler-mead technique, for determining a rim size and the points of interests.

As will be clear from the foregoing description, the present subject matter facilitates alignment of wheels using non-contact, optical techniques. The automated identification of the rim precludes the involvement of any manual labour in determining the alignment of the wheels. In addition, the use of the LED image along with the laser image provides a considerably robust and effective manner of determining the alignment of the wheels. For example, the LED projected on the wheel can provide a substantial contrast between the rim and the wheel and can facilitate in accurately identifying the rim. As a result, accurate alignment of wheels is achieved in accordance with the present subject matter. In addition, the scheme of wheel alignment according to the present subject matter takes into account a large number of reference points on the wheel rim. Such a provision facilitates in substantially accurate and fast determination of alignment of the wheel. In addition, all the reference points are obtained in a single frame of the image and multiple images are not required, further facilitating in fast and convenient determination of the alignment of the wheel.

Figure 1B:
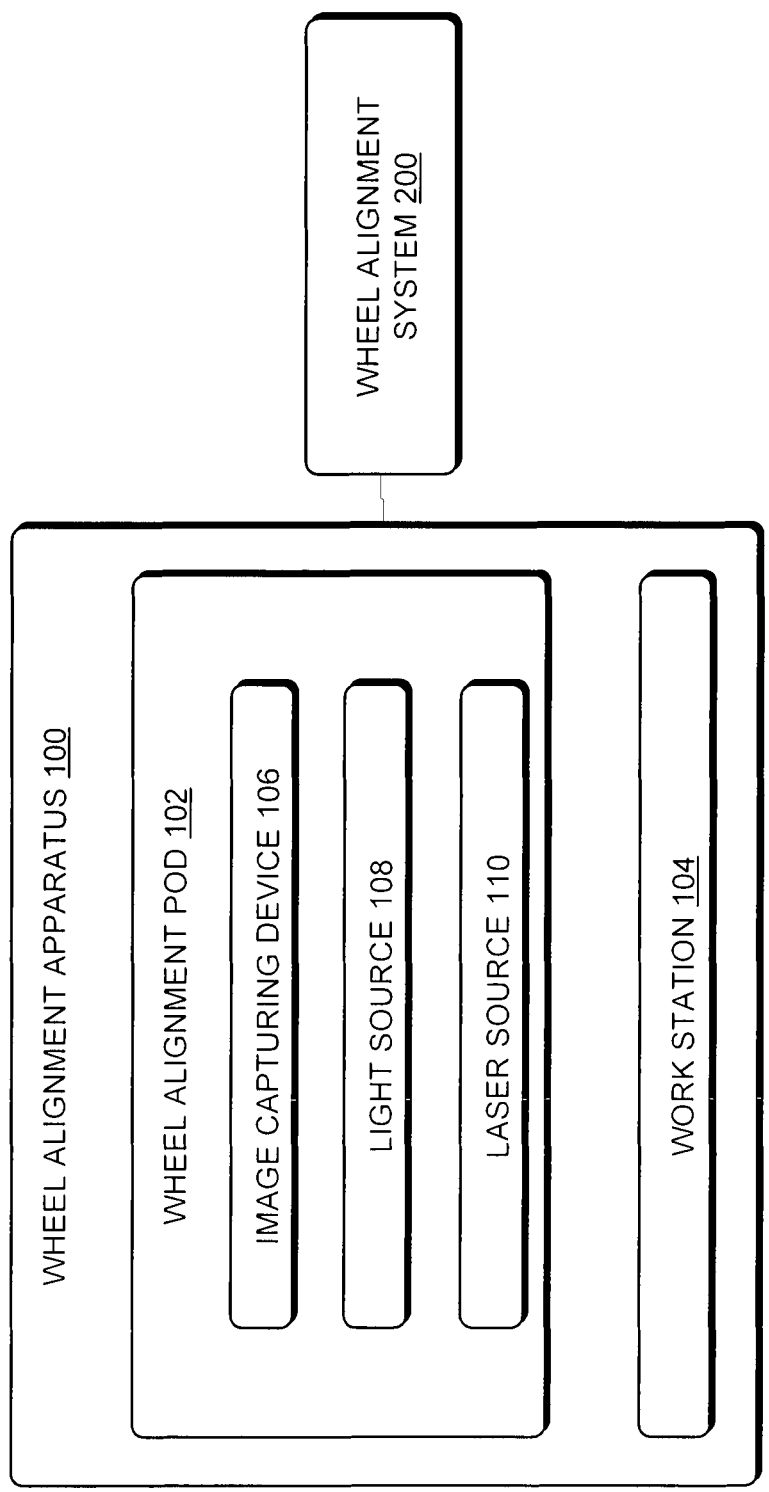
FIG. 1b illustrates a block diagram of a wheel alignment apparatus 100, in accordance with an embodiment of the present subject matter.

FIG. 1a shows the setup of the wheel alignment apparatus 100, in accordance with an embodiment of the present subject matter. FIG. 1b shows a schematic of the wheel alignment system 100 (along with various components), in accordance with an embodiment of the present subject matter.

In an embodiment, the wheel alignment apparatus 100 has a laser 110 to project one or more laser lines on a wheel of the vehicle for which the alignment is to be carried out, a light source 108 to illuminate the wheel, and an image capturing device 106, such as a digital camera, to capture image of the wheel. In an implementation, one laser 110, one light source 108, and one image capturing device 106 can be provided at each wheel of the vehicle. In one example, the light source is a light emitting diode (LED). Further, the laser 110 can be selected to have an output frequency corresponding to a response of the image capturing device. In an example, the laser 110 can project five horizontal lines on the wheel. A work station 104 is provided which serve two purposes. First, it acts as a platform wherein the vehicle, whose wheel alignment is to be checked, is parked. Second, it provides the reference plane for calibration of image wheel alignment pods 102.

Further, the wheel alignment apparatus 100 can include a wheel alignment system 200 for identifying, automatically, a rim of the wheel and for determining an angle of inclination of the wheel with respect to the image capturing device 106. The wheel alignment system 200 can execute the following steps—First, capturing an image of the wheel when the wheel is illuminated by the light source 108, the image referred to as the LED image. After that an image of the wheel is captured when the laser 110 projects the horizontal lines on the wheel. This image is referred to as the laser image. Last, capturing an image of the wheel when both the light source 108 and the laser 110 are turned off, the image referred to as the control image. Precious mentioned steps are followed by obtaining a corrected LED image and a corrected laser image from the LED image and the laser image, respectively, using background subtraction technique (subtracting the control image from the respective image) and estimating a preliminary rim position using the corrected LED image, the preliminary rim position indicative of a rough position of rim of the wheel. The preliminary rim position is estimated using Hough transform technique. Simultaneously extracting and determining profiles of the laser lines on the wheel using Radon transform technique and energy functional technique. Using the preliminary rim position and the profiles of the laser lines on the wheel, corrected rim location and points of interest (POIs) for the wheel are determined. Such a technique is able to determine the corrected rim location to be considerably accurate with reference to the actual rim location.

The first image, i.e., the LED image is taken with the light source 108, such as a group of LEDs, illuminating the wheel and the laser lines turned off; the second, i.e., the laser image, is taken with the laser 110 on but with the light source off; and the third, i.e., the control image, is taken with both the light source and the laser switched off. The first image is mainly for rim extraction, while the second image is for laser lines segmentation. The third image is subtracted from the first and second images so that the technique for determining wheel alignment is more robust to the variations of ambient illumination and background objects.

To identify each laser line from the captured image, a series of image processing techniques, such as the Hough transform and Radon transform, are used to estimate the position of the rim and laser lines. After determining the position of the rim and the laser lines, certain laser points identified along each laser line are selected from a region on the tire with a fixed distance from the rim. The use of the tire near the rim avoids problems associated with the varied appearance of the rim itself. Accordingly, the wheel alignment as achieved in the present subject matter eliminates the need for large number of images of the wheel as done in the conventional techniques.

Before it can be used, the wheel alignment apparatus 100 is required to be set-up. The set-up of the wheel alignment apparatus 100 involves the following steps. First, calibration of the image capturing device 106 with reference to a laser 110 and an object (for example, the wheel) using laser triangulation technique. During calibration, the object used can be a checker board or a spherical surface. Second, unifying the calibrated image capturing devices (one for each wheel) into a single reference frame.

The set-up of the wheel alignment system 200, including calibration is explained in detail later.

The wheel alignment system 200 of the wheel alignment apparatus 100 is used to acquire three-dimensional data and a number of innovative methodologies have been developed in order to identify each scanned wheel's features and more importantly to derive its orientation relative to the optical sensor. The orientation of each wheel is then placed in a global coordinate frame relative to the rear axle of the car. The use of image filters, robust and noise immune line fitting and optimization are all designed to alleviate problems caused by variations in lighting levels and inconsistencies in the mode of operation. The wheel alignment system 200 can determine the toe, caster and camber of each wheel. The wheel alignment system 200 is able to determine orientation (camber) varying from −5 to 5 degrees and a toe of −20 to 20 degrees, at a distance of 1 meter (m).

The operation of the wheel alignment apparatus 100 of the present subject matter is based on the following principles—the wheel alignment apparatus 100 should be capable of determining the orientation of a car wheel, the wheel alignment system 200 should be able to operate with minimal constraints on the environment, and the component cost of the wheel alignment apparatus 100 should be as low as possible. These specifications keep the focus of the wheel alignment apparatus 100 at all times on practicality; in other words, to ensure that the developed system is genuinely useful in a commercial environment.

Referring to FIG. 1b, wheel alignment apparatus 100 comprises of a work station 104, plurality of wheel alignment pods 102 and a controlling device 200. Wheel alignment pod 102, in an embodiment, comprises of an image capturing device 106, a light source 108 and a laser source 110.

The present subject matter can employ a wide range of imaging techniques based on the principal of triangulation, which can be defined as the location of an unknown point by the formation of a triangle having the unknown point and two known points as vertices.

In one case, multiple laser lines, for example, 5 laser lines are projected onto the scene from a known location with respect to the image capturing device. The image capturing device 106 is calibrated such that the projection angles of the laser lines relative to the image capturing device 106 are known. As such, the 3D coordinates (relative to the sensor) of the intersection of the laser lines and the surface of interest can be calculated for each point on the line. However, in order to apply triangulation successfully, the laser lines are isolated from ambient lighting.

There are a number of measures which can be taken to partially alleviate the interference of environmental lighting. Spectral filters can be used to match the image capturing device 106 response to the frequency of the laser. In an embodiment, the following equipment can be used in the wheel alignment apparatus 100.

Figure 1C:
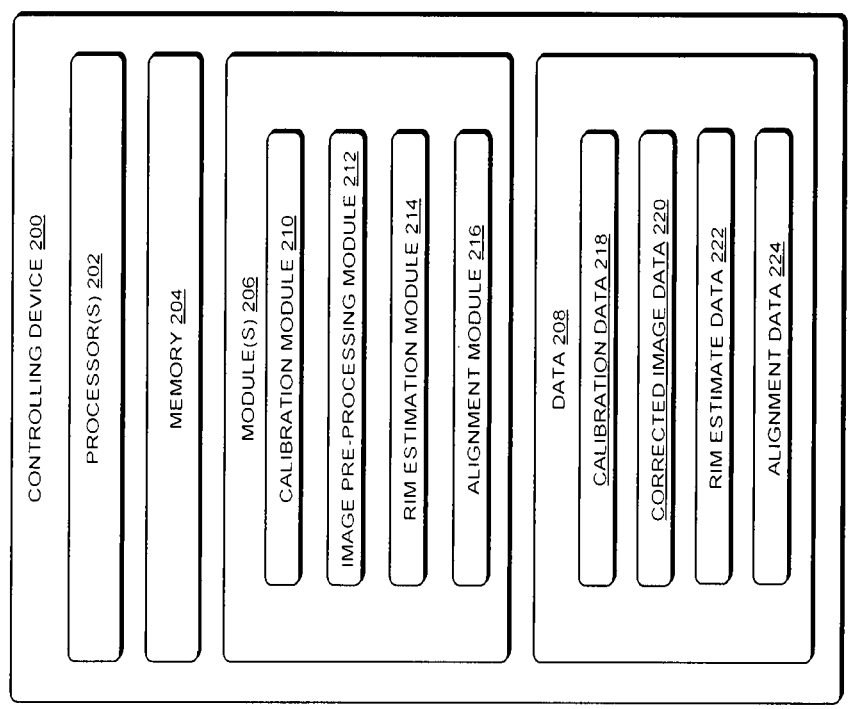
FIG. 1c illustrates an alignment system 200, accordance with an embodiment of the present subject matter.

For image capturing, in one implementation, a digital camera is used. The spectral response of the image capturing device 106 can also be a consideration while selecting the device. A reasonable response is required that corresponds to the output frequency of the laser. FIG. 1c illustrates a spectral response of the image capturing device 106. In one case, the wheel alignment system can use 4 image capturing devices.

Further, the image capturing device 106 can include a filter. In an implementation, the filter can be a narrow band pass filter, say having a wavelength 695 nm. For storage, the image capturing device 106 can use a storage media, such as a memory card. This card enables a laptop PC to communicate the software trigger signals to hardware signals, controlling laser 110 and image capturing device 106.

As mentioned above, for wheel alignment, the wheel alignment apparatus 100 uses a laser. In one example, the laser source 110 can be a class II 635 nm laser from Laser 2000 (with 5 line generator optics assembly). The choice of laser can be decided according to compliance with safety regulations. However, an as powerful as possible (in terms of output intensity) laser can be used whilst complying with safety regulations. The selection of laser frequency is dictated partly by image capturing device response and partly by the coloured glass filter ranges. For example, a laser with a frequency of 635 nm and wattage of 0-6.5 mW can be suitable.

The light source 108 is used in the system to facilitate rim detection. In one example, the light source can be a light emitting diode (LED).

The working distance of the apparatus 100 can vary based on different factors, including the size of vehicles that the wheel alignment system caters to. For example, the working distance can vary from to 0.9 m to 1.5 m, and in one case, the working distance be selected to be around 1 m. The field of view at 1 m is approximately 0.7 m×0.6 m.

Figure 1D:
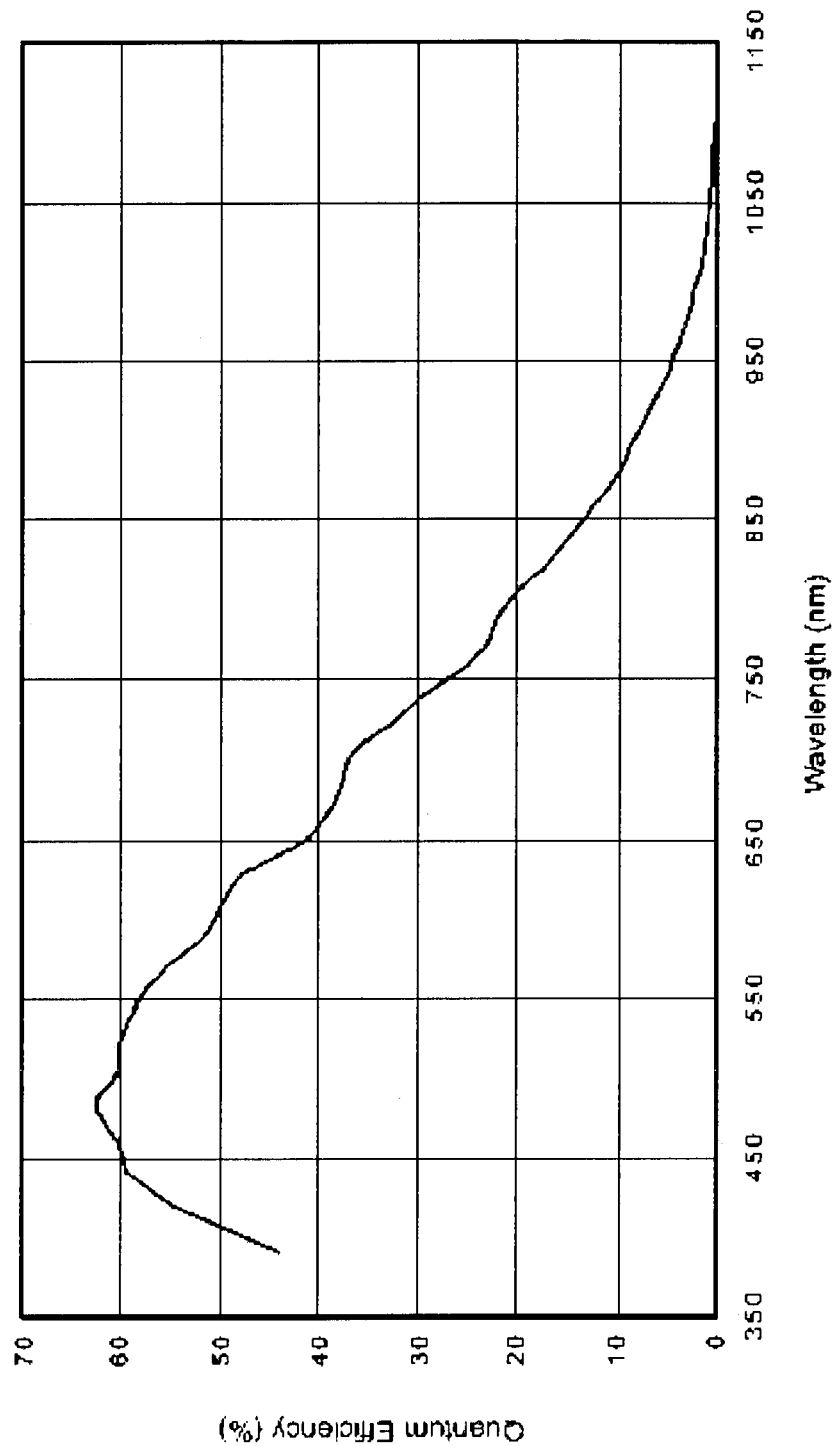
FIG. 1d illustrates a spectral response of an image capturing device of the wheel alignment system, in accordance with an embodiment of the present subject matter.
Figure 1E:
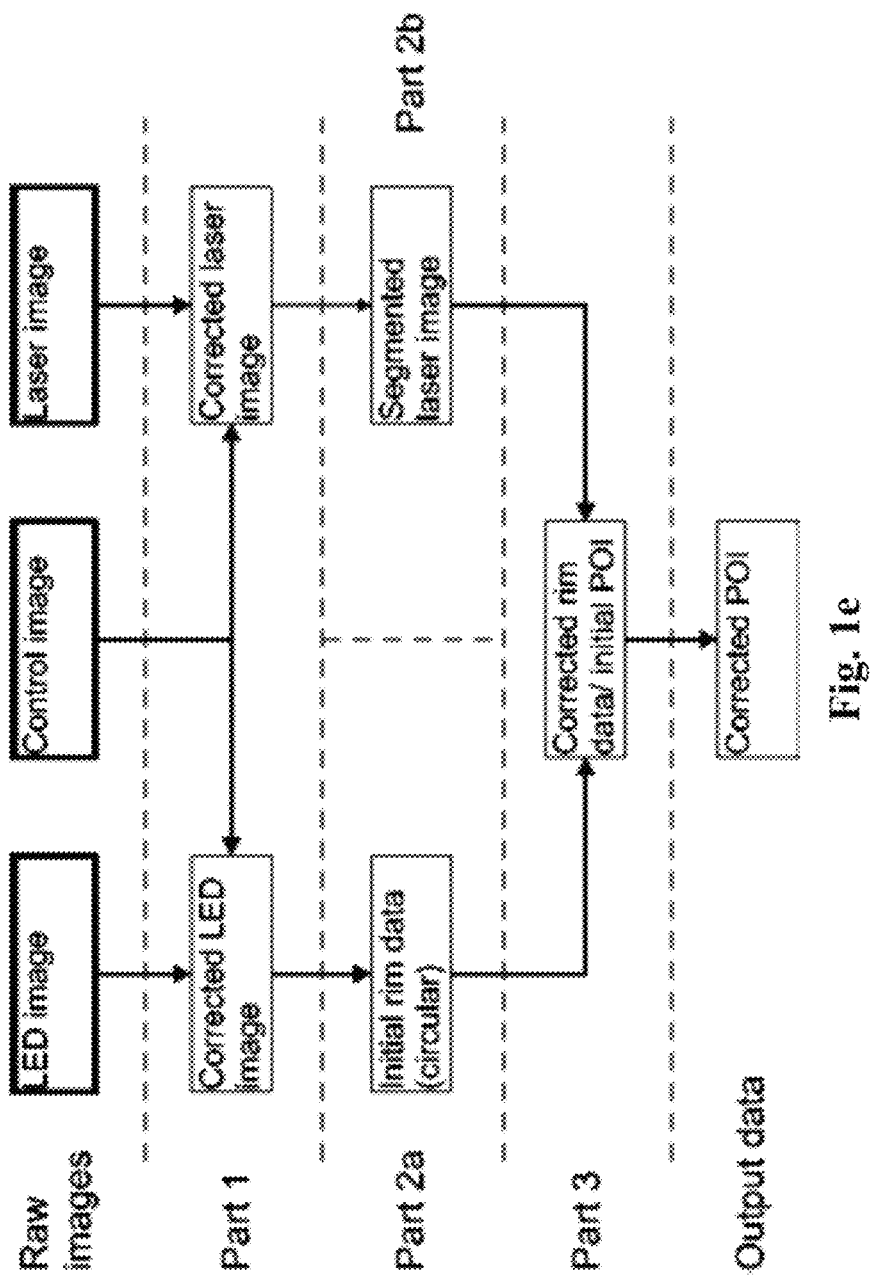
FIG. 1e illustrates a schematic of a method of detecting point-of-interest (POI) in an image captured using the image capturing device, in accordance with an embodiment of the present subject matter.

FIG. 1d illustrates a methodology to detect point of interest in an image of the wheel-taken by the image processing device 106. In one case, the raw images are captured by the rig and the image co-ordinates (not to be confused with the world co-ordinates) of the Points of Interest (POIs) are extracted. The POI located on the laser line just outside the rim on tire is selected for use as this can be defected more robustly than inside the rim, but with less distortion than the outer tire. The procedure applied separately to each wheel.

Figure 3:
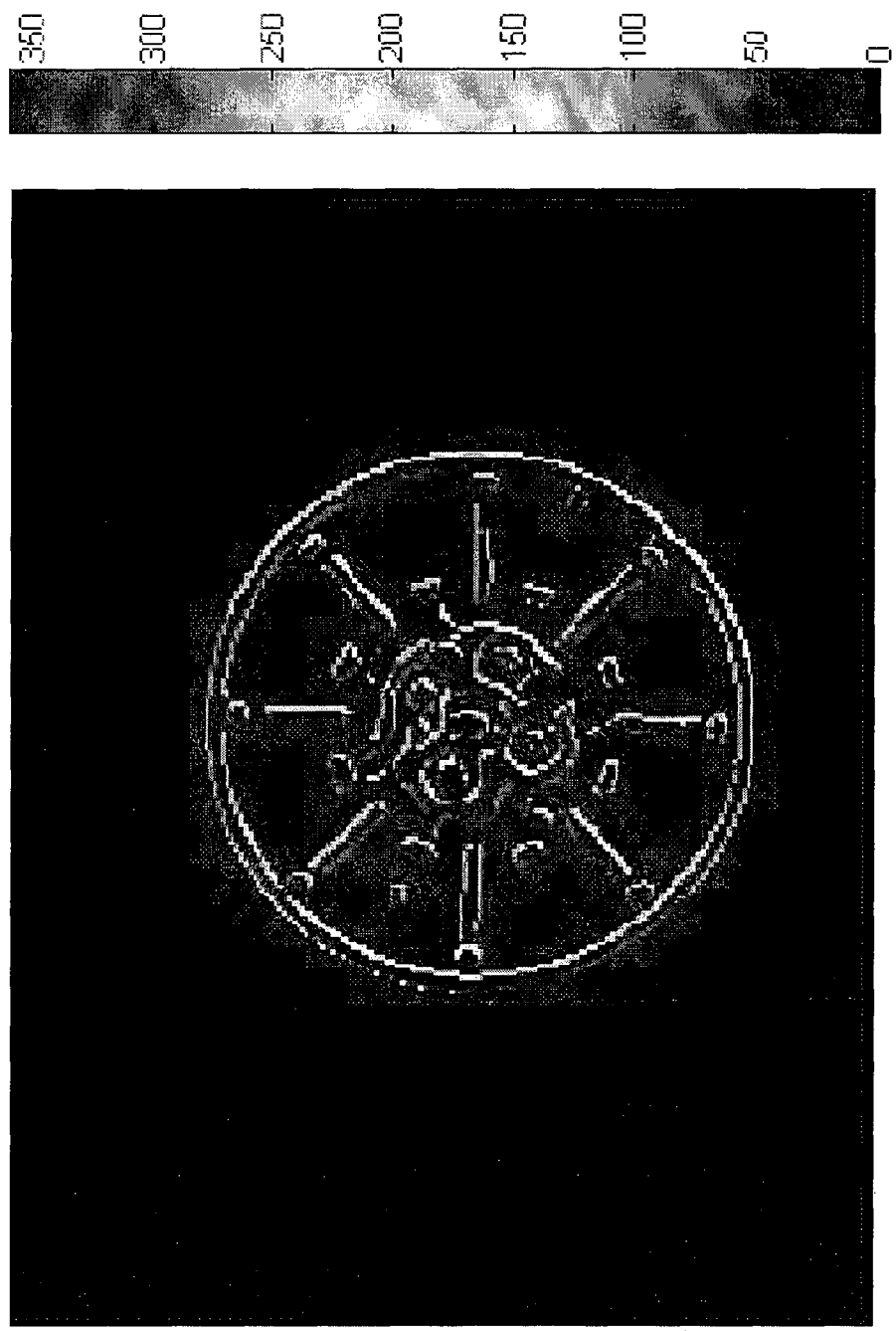
FIG. 3 illustrates edges of the wheel detected in the image and an intensity gradient direction of the edges, in accordance with an embodiment of the present subject matter.

As shown in FIG. 1d, the method is divided into stages 1, 2a, 2b and 3. In summary, three images are captured by the hardware: one image with the light source 108 illuminating the wheel and the laser 110 being switched off; a second with the laser 110 ON and the light source 108 being switched OFF, and a third with both switched OFF. Part 1 then uses the third image to control for background illumination. Corrected LED image and corrected laser image are together referred as corrected image data 220. Stage 2a extracts an initial estimate of the location of the rim in the image assuming that it appears circular. Stage 2b extracts the locations of the laser line from the second image. These sections are referred to as Stage 2a and 2b as they work independently from each other, as shown in FIG. 3. Images obtained from this stage are together referred as the rim estimate data 222. Finally, Part 3 uses rim estimate data 222 from Part 2 to simultaneously improve the estimate of the rim (now allowing for it to appear elliptical in the image) and identify the POIs, which occur at the intersections between the rim and the laser line. The data so obtained is stored in the alignment data 224.

FIG. 1c illustrates the alignment system 200 of the wheel alignment apparatus 100, in accordance with an embodiment of the present subject matter. In said embodiment, wheel alignment system 200 comprises of a processor 200, a device memory 204, and various modules 206. Modules 206 comprises of calibration module 210, image pre-processing module 212, rim estimation module 214, and alignment module 216. Functions of various modules are explained in subsequent embodiments.

Image pre-processing module 212 pre-process the images captured by image capturing device 108 to produce corrected image data 220. Corrected image data 220 comprises of a corrected LED image and corrected laser image.

Figure 2:
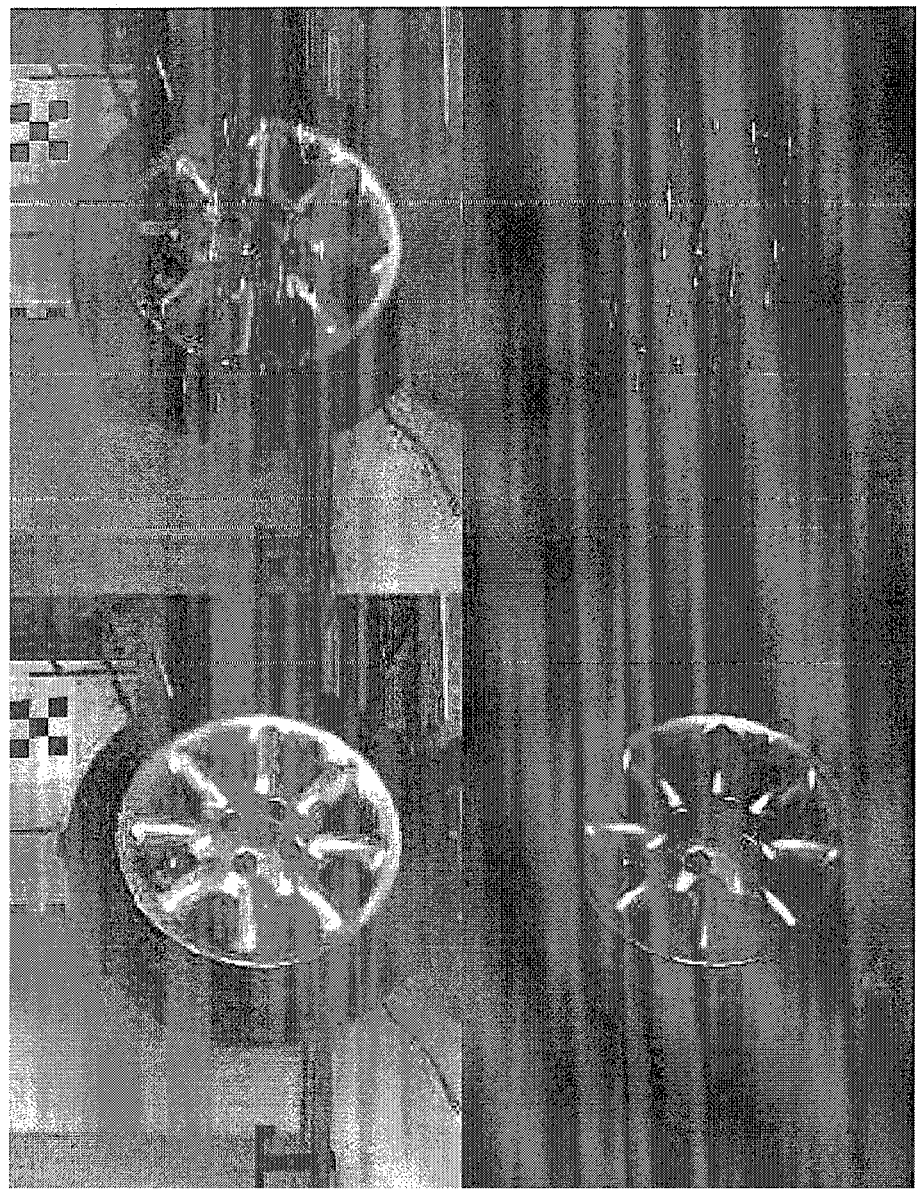
FIG. 2 illustrates raw images obtained from the image capturing device after background subtraction, in accordance with an embodiment of the present subject matter.

Methodology used by image pre-processing module 212 is very simple and intends to counter any variations in background illumination. In the first instance, these effects are already minimized due to the use of a narrow-band filter that is tuned to the frequency of both the laser 110 and the light source 108. In other words, most of the light entering the image capturing device is due to the laser 110 or the light source 108. However, it is still possible that some ambient light contains the same frequency and so a "control image" is captured. According to the methodology, simply a point-wise subtraction is achieved: first between the LED image and the control image and then between the laser image and the control image. Further processing is then carried out only on the resulting difference images. In practice, this differencing technique has little impact on the LED image, but can be a critical step for the laser image. FIG. 2 illustrates the process of background subtraction. In this case, FIG. 2 illustrates raw images obtained from the image capturing device, illuminated by the light source, say the light emitting diode (LED), and by a laser 110, respectively, after background subtraction.

In continuation to previous step, the rim estimation module 214 executes the process of extracting rim dimensions from the corrected LED image and laser lines from corrected laser image. Purpose of rim estimation module 214 is to obtain an estimate of the rim and wheel centre locations in the image. As part of the methodology, the rim estimation module 214 detects an ellipse in the image. However, in practice this is a difficult and computationally intensive task to complete in one step. Hence, it is assumed that the wheel appears circular in the image and an elliptical correction takes place later, in Stage 3.

The method for circle detection in image processing is to use the Hough Transform. This converts a 2D image into a space that represents parameters of geometric shapes and their locations. For example, the Line Hough Transform has two dimensions to represent the angle and position of one or more lines. Peaks in Hough space relate to the position and angle of lines in the real image. The Hough Transform is for binary images only, so initial edge detection is typically involved.

As circles are defined by three parameters (x-centre, y-centre and radius—x0,y0,R), a three-dimensional Hough space is required for circle detection, since for ellipse detection five parameters are necessary (x-centre, y-centre, x-radius, y-radius and orientation). This is one of the reasons that it is so difficult in practice to use an ellipse. Using the circle instead provides for less computational resources without compromising the accuracy. According to the methodology only the circle centre (not radius) is searched for and so the operation lies in 2D Hough space. This is ideal for a wheel as there may be several concentric circles present, especially with steel rims. Each of these circles project to a different coordinates in (x0,y0,R) space but the identical coordinate in (x0,y0) space. This approach therefore has the advantages that (1) the search is much faster due to lower dimensional search space and (2) the method is more robust as more data is projected to a single point and there are, hence, far fewer false positives. It has the minor disadvantage that a second search is needed to estimate the radius. However, this is a one-dimensional search and so involves negligible processing resources.

In one example, the rim estimation module 214 can achieve the rim estimation the using the following parameters:

x and y border=400 px. The centre of the wheel is not within this distance of the image border.

x and y step=1. The resolution in wheel centre search is to within this number of pixels.

r min/max=400/900 px. The wheel rim radius falls between these two values for radius.

r step=1. The resolution in wheel radius search is to within this number of pixels.

resolution=0.1. To greatly increase the search speed, the image resolution was reduced to this value for the search. This also aids robustness as the edge coordinate are mapped to a smaller area in Hough space. Rim estimation module 214 then applies edge detection to find edges in the image. In an example, good results can be achieved using Canny threshold=0. Further, the direction of the intensity gradient, θ, is determined for each "edge" (edge pixel) as located in the previous step. This means that the relative direction of the circle's centre from each edge on the rim is known (assuming that the rim is brighter than the tyre). FIG. 3 shows the edges and intensity gradients of the head-on view of the wheel from FIG. 2. This step is followed by initialization of Hough space. In an example, bins of x0 and y0 can be defined for Hough space, i.e.

$$x\text{Bins}=(x\text{Min}:x\text{Step}:x\text{Max});$$

$$y\text{Bins}=(y\text{Min}:y\text{Step}:y\text{Max});$$

(Hough space is essentially a histogram-like accumulator). After the rim estimation module 214 has initialized Hough space, it performs the process of accumulation of Hough space. For each edge (x, y) for each x0 bin calculate the possible values of y0 using the following relation in one example:

$$\frac{dy}{dx} = -\tan\theta = \frac{x-x_0}{y-y_0}$$

Figure 4:
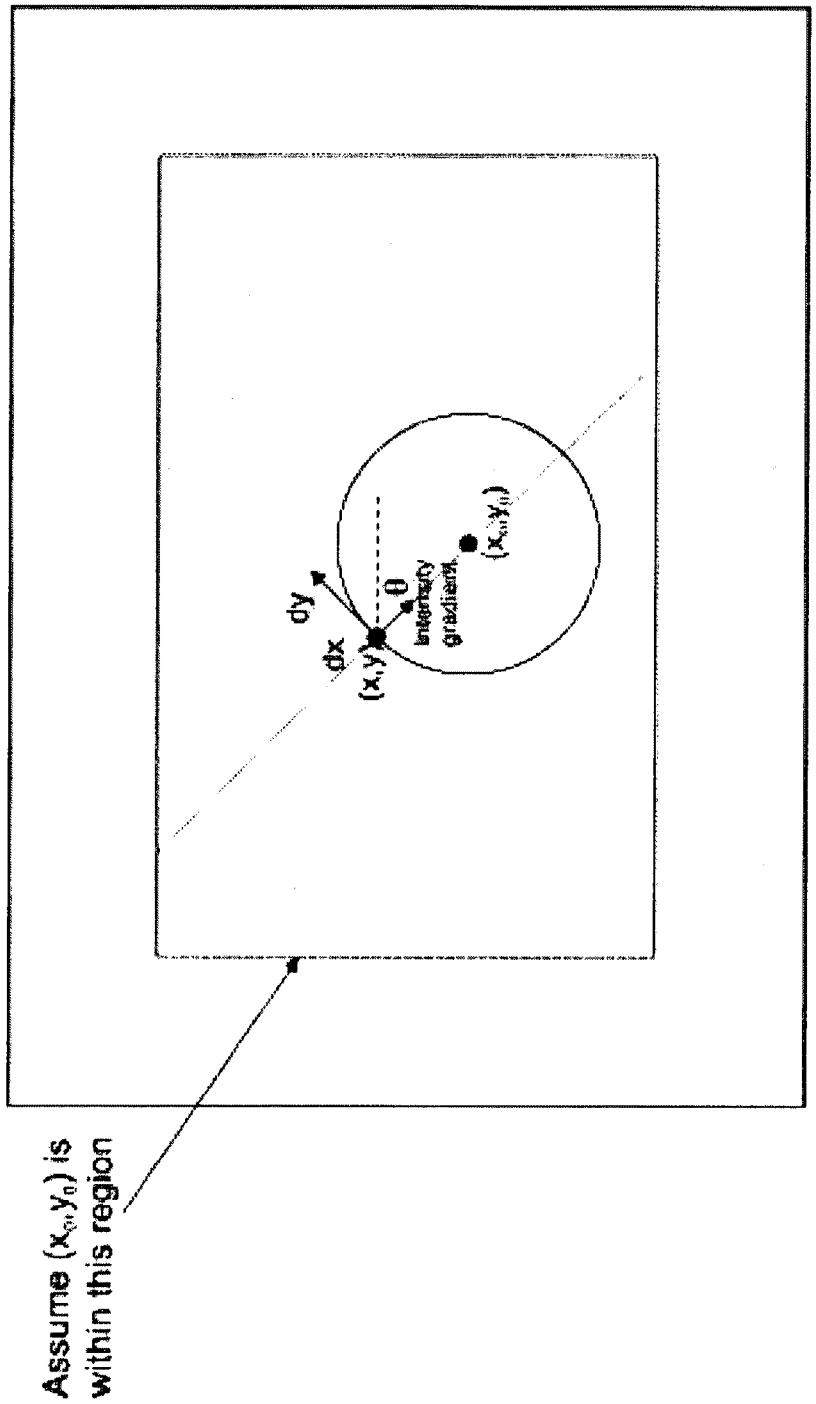
FIG. 4 illustrates a method for definition of parameters for Hough transform for determining a rim of the wheel from the image, in accordance with an embodiment of the present subject matter.
Figure 5:
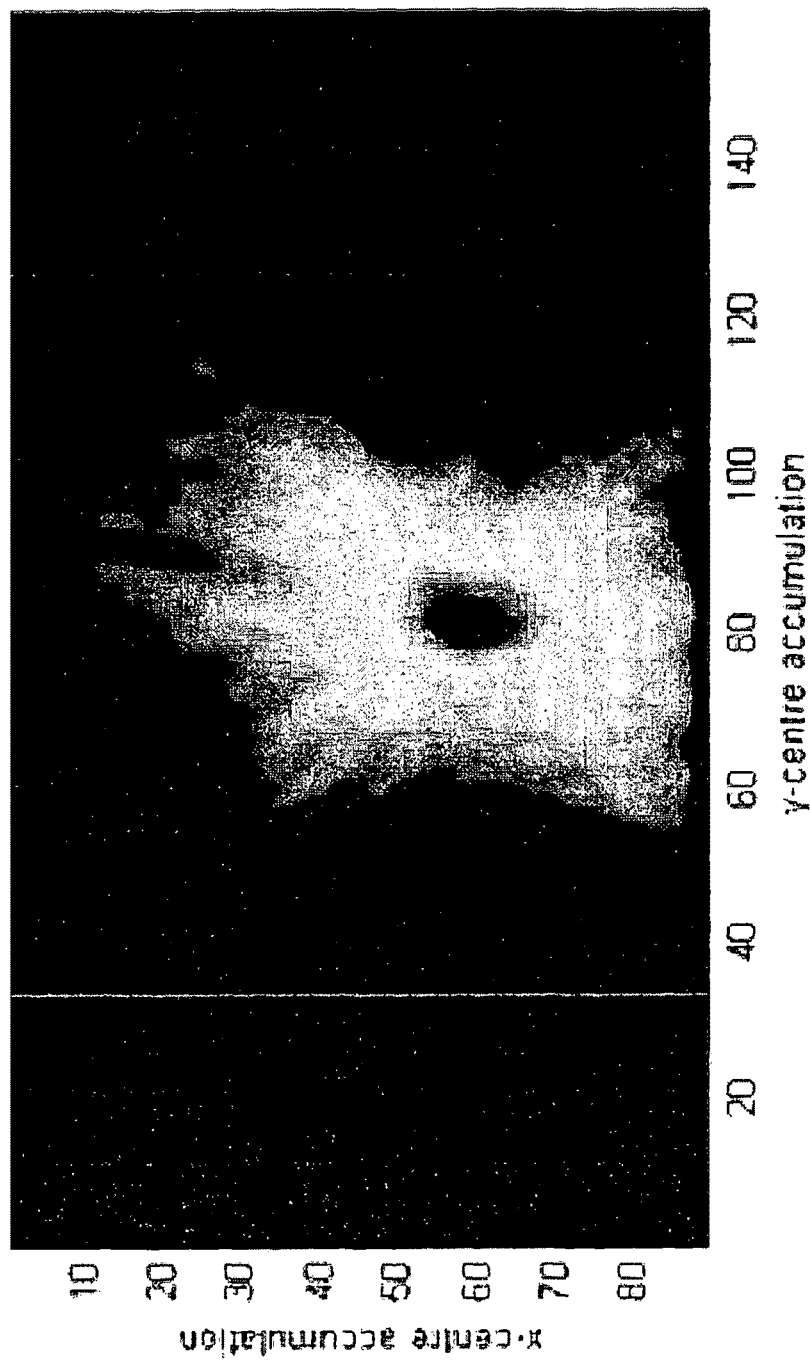
FIG. 5 illustrates an image showing Hough space determined based on the Hough transform, in accordance with an embodiment of the present subject matter.
Figure 6:
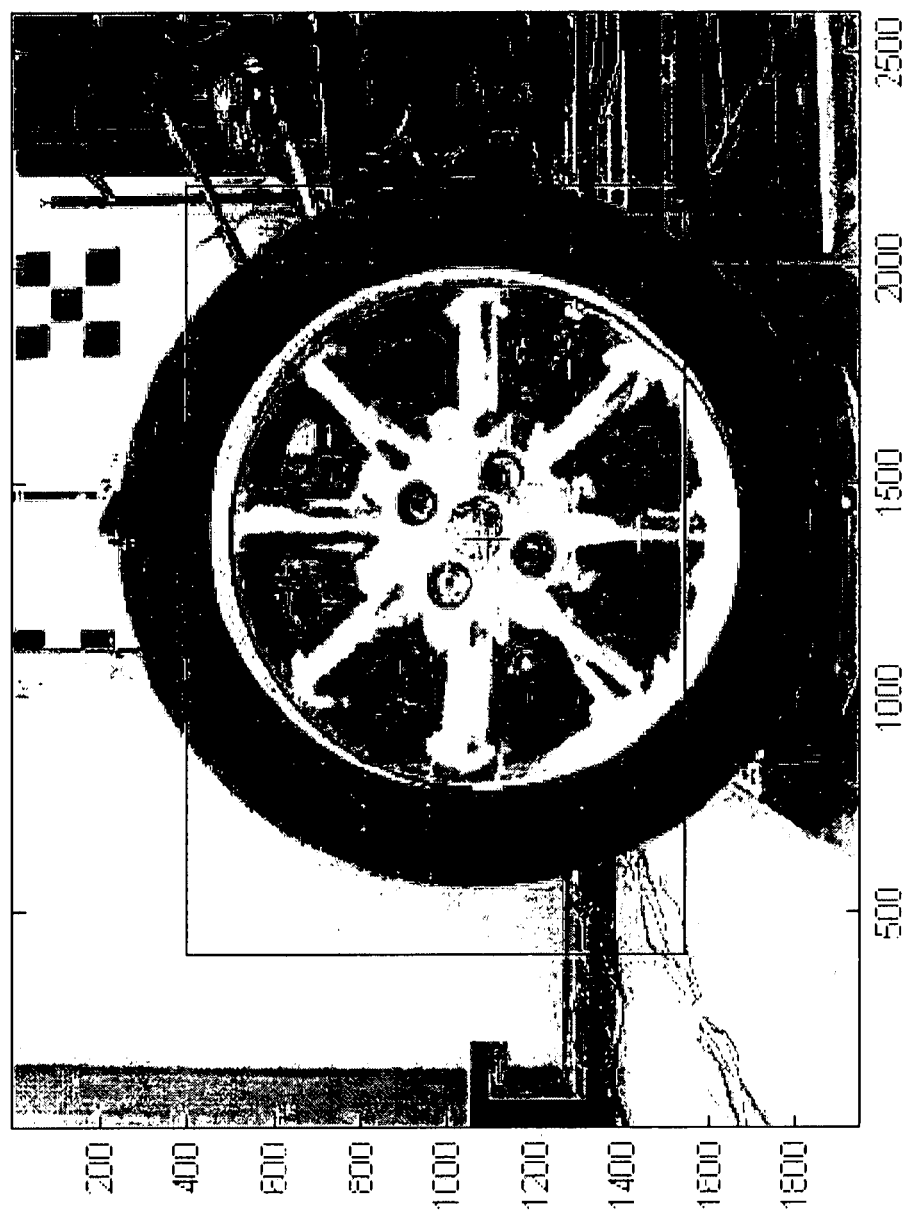
FIG. 6 illustrates a circle indicating the rim of the wheel estimated based on the Hough transform, in accordance with an embodiment of the present subject matter.
Figure 7B:
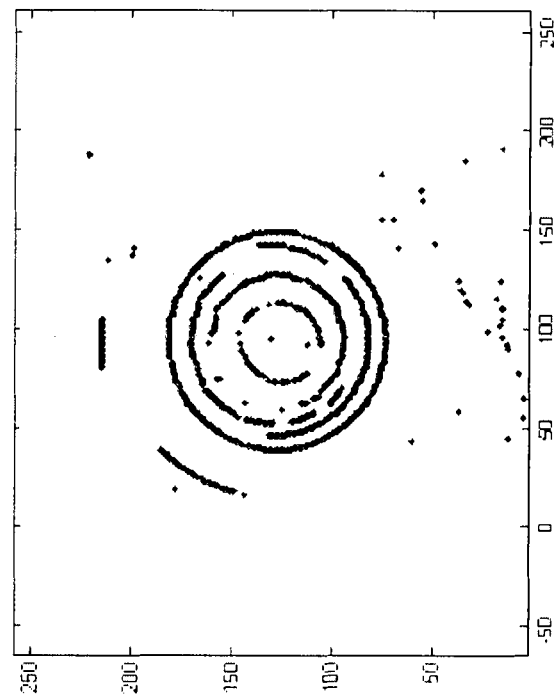
FIGS. 7a and 7b illustrate results of canny methodology showing detected points, in accordance with an embodiment of the present subject matter.
Figure 7A:
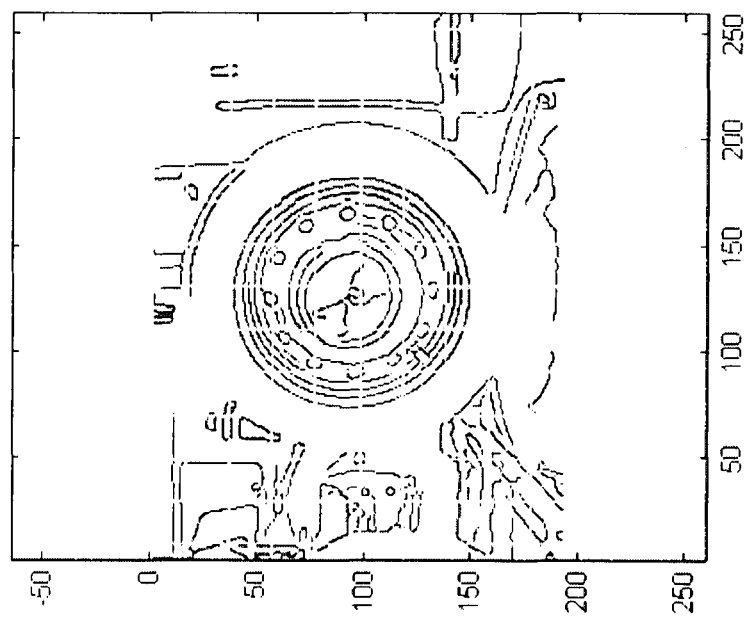

Then the value is rounded to the nearest y0 bin by rim estimation module 214 by increment the accumulator array for the corresponding x0 and y0 bins. This step is ignored if the corresponding values of x0 and y0 cause the radius to be too large to speed up the processing (don't ignore "too" small values though as the inner concentric rings of the wheel can help find the centre more robustly if they are present). FIG. 4 defines some of the quantities in real search space. The line indicates the allowed positions where a circle centre may lie for any given edge. The resulting Hough space is shown in FIG. 5. For this case the circle centre(s) fall at around (85, 60). Finally rim estimation module 214 applies Gaussian smoothing to the accumulator array and use the location of the maximum value to determine the correct values for x0 and y0. A simple 1D Hough Transform is needed to find the radius of the circle as shown in FIG. 6. To improve robustness to different wheel types, a calculation can be done so that any coordinate with an intensity gradient direction outside a certain threshold from the direction to the centre from that point are discarded. This has the added benefit that it is always (almost) the wheel that is found, not the outer edge of the tyre. In an example, the equation that determines whether to include a particular point is:

$$\theta = \arccos\left(\frac{v_i \cdot v_c}{\|v_c\|}\right)$$

where $v_i$ is a unit vector in the direction of the intensity gradient and $v_c$ is a vector between that point and the estimated wheel centre. This angle needs to be kept below a threshold to be included (a value of about 8 degrees will suffice, but the exact value is not critical). FIGS. 7a and 7b illustrate the coordinate not considered in the radius estimation as a result of this step, which are determined using the canny methodology. FIG. 9a shows the points detected by the canny methodology performed by rim estimation module 214 and FIG. 9b illustrates the same coordinate after removal of those not obeying the intensity gradient criterion With more time, it is suggested that this step is incorporated into the 2D part of the methodology.

Figure 8:
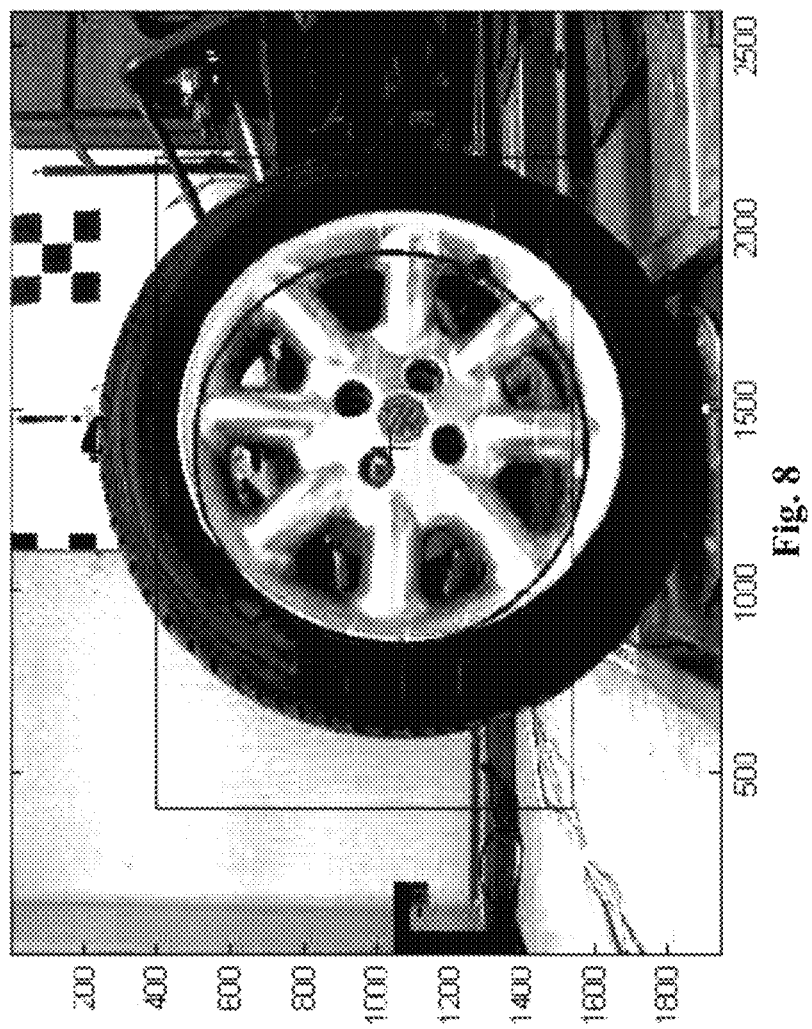
FIG. 8 illustrates a circle indicating the rim estimated for a wheel angled at about 10° to the image capturing device, in accordance with an embodiment of the present subject matter.

FIG. 8 illustrates the wheel placed at an angle and the initial rim estimate indicated. It may appear that the methodology has failed in this case but it should be noted that this is only an initial estimate of the rim and that the inaccuracy will be corrected in Part 3 of the methodology For most of the wheels considered, the entire circle detection methodology works in lower resolution than the rest of the method. The reason for this is twofold. Firstly, this dramatically reduces computation time. Indeed, the method would be unfeasible but for this reduction. At 50% resolution, this part of the methodology takes of the order three minutes, while at 10% resolution, computation time is reduced to a couple of seconds. Secondly however, the methodology performs better at low resolution due to the reduced number of spurious edges found in the canny edge detector. However, for the specific case of black wheels, a slightly higher resolution is necessary in some cases (see results section below).

Figure 9:
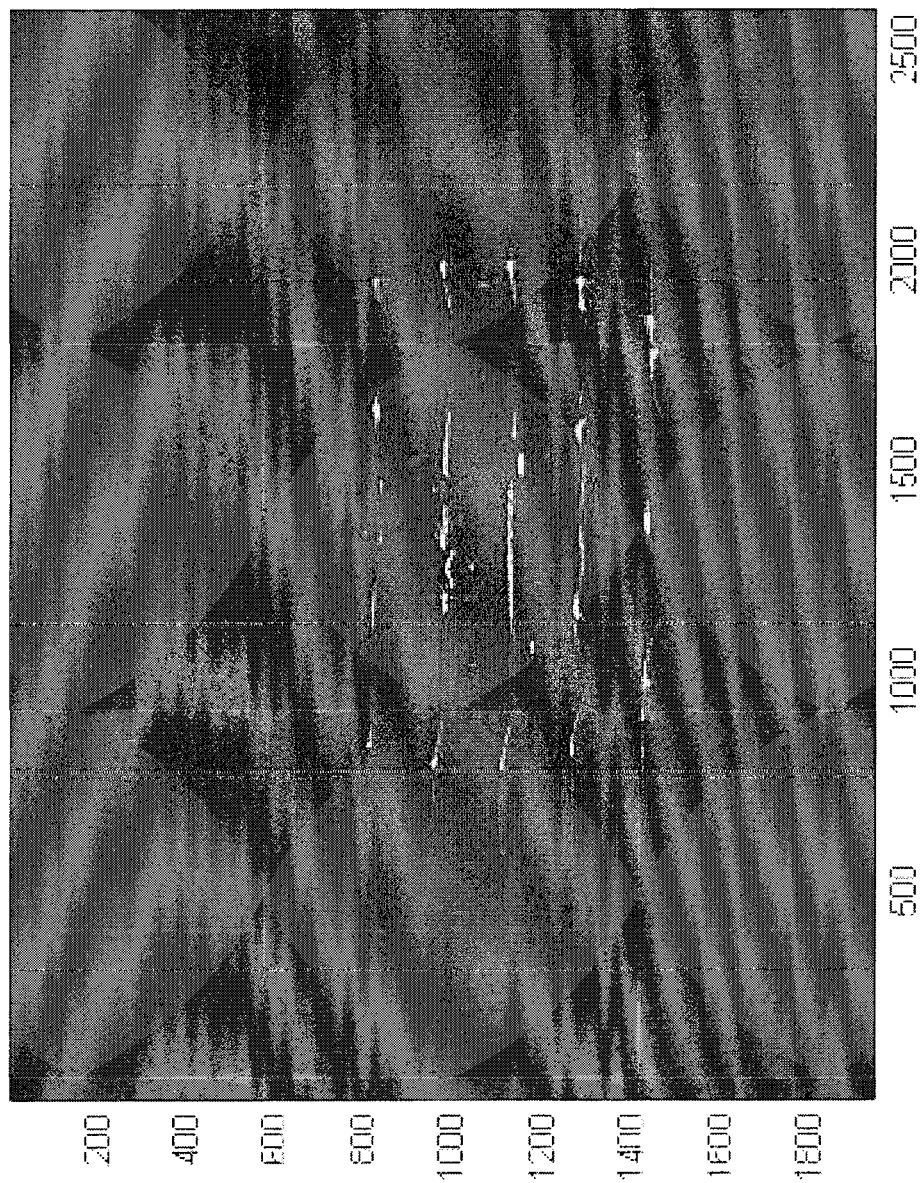
FIG. 9 illustrates an image of laser lines on the wheel obtained after background subtraction, in accordance with an embodiment of the present subject matter.

In laser line extraction process, goal of the rim estimation module 214 is to extract the laser lines from the raw image. In order for the 3D computation to work, it is necessary to know the labeling of laser lines (labeled 1 to 5 from the bottom). FIG. 9 shows an example laser image with the background removed. While the lines are clearly visible to the naked eye, this figure clearly shows a number of difficulties. First, the line can fade in places (e.g. due to foreshortening). Second, inter-reflections may confound the laser detection. Third, gaps in the laser line make it difficult to obtain continuous segmentation. Fourth, the laser lines are very close to each other.

The methodologies executed by rim estimation module 214 in the present subject matter are provided to overcome the above mentioned difficulties. However, it is important to note that the cost associated with the wheel alignment system, the low-cost laser was selected which is slightly inhibiting in this case.

While use of a simple fixed threshold methodology to segment the laser line (i.e. assume that all pixels of intensity above the threshold form the line and those below are not on it) may vaguely work for a few cases, this is clearly not robust to novel illumination, wheel types, pose and inter-reflections etc. So, rim estimation module 214 performs the sophisticated method for segmentation works as follows.

The rim estimation module 214 performs laplace transform to boost the features of corrected laser image. The use of processing corrected laser image using the Laplace Transform is investigated with the following motivation. The laser lines are very fine on the images. As things stand, this short and simple step is left in the methodology, but it should be noted that testing indicates little improvement due to laplace application.

Figure 10:
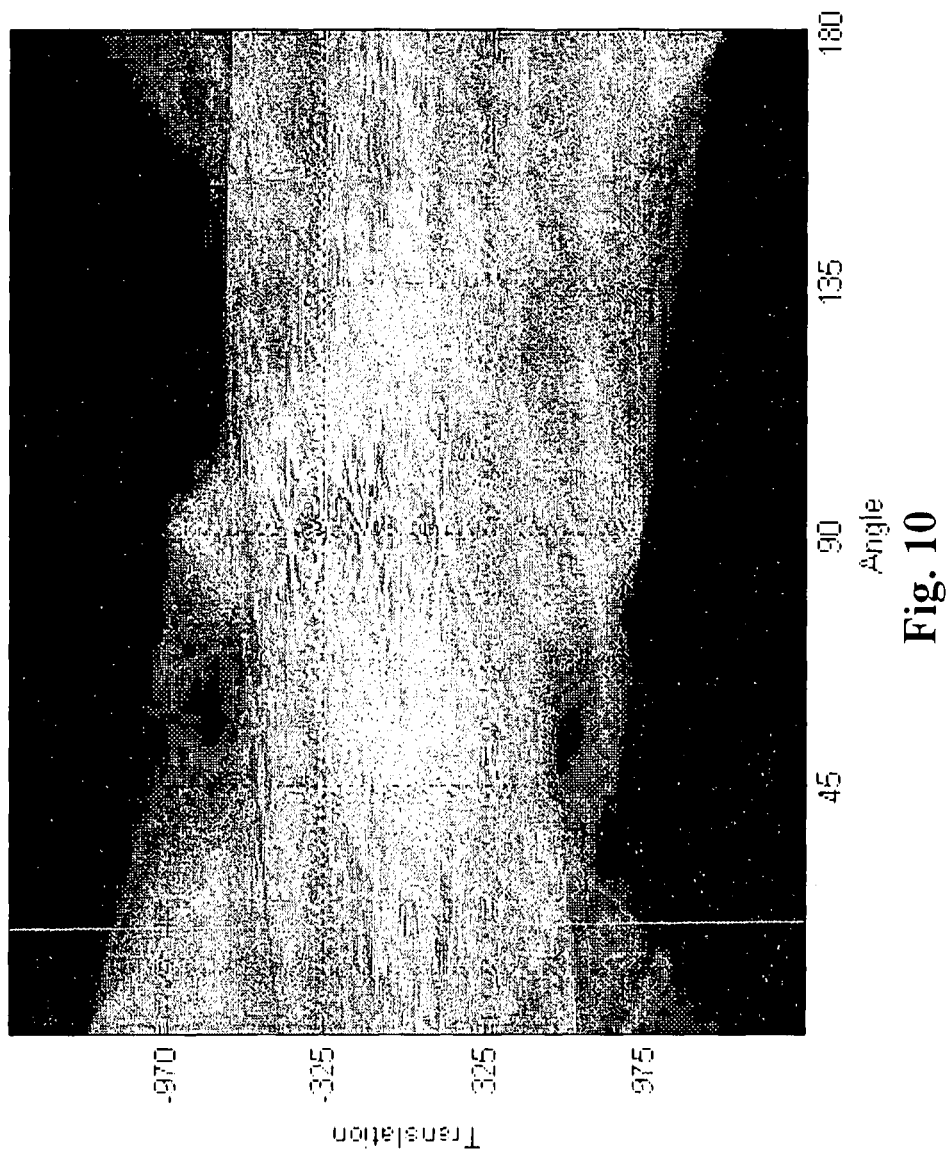
FIG. 10 illustrates a Radon transform of the image of laser lines for laser line extraction, in accordance with an embodiment of the present subject matter.

Further, rim estimation module 214 performs radon transform to extract laser lines. Radon transform is applied because each laser line has a certain direction and position associated with it (even though it is not completely straight). Radon transform is good at extracting this type of information. This method takes the Radon transform of the absolute value of the Laplacian of the image. This gives a measure of the importance of different lines (at any orientation) across the image. An example of the Radon transform for a wheel image with laser lines is shown in FIG. 10. Rim estimation module 214 then use peaks in the Radon transform image to extract the position of the straight lines that best approximate the laser lines. For the case in FIG. 10, five near-horizontal peaks at different positions are identified—one corresponding to each line. For the rest of the description of this part of the methodology, results for single laser lines are shown for clarity.

Figure 11:
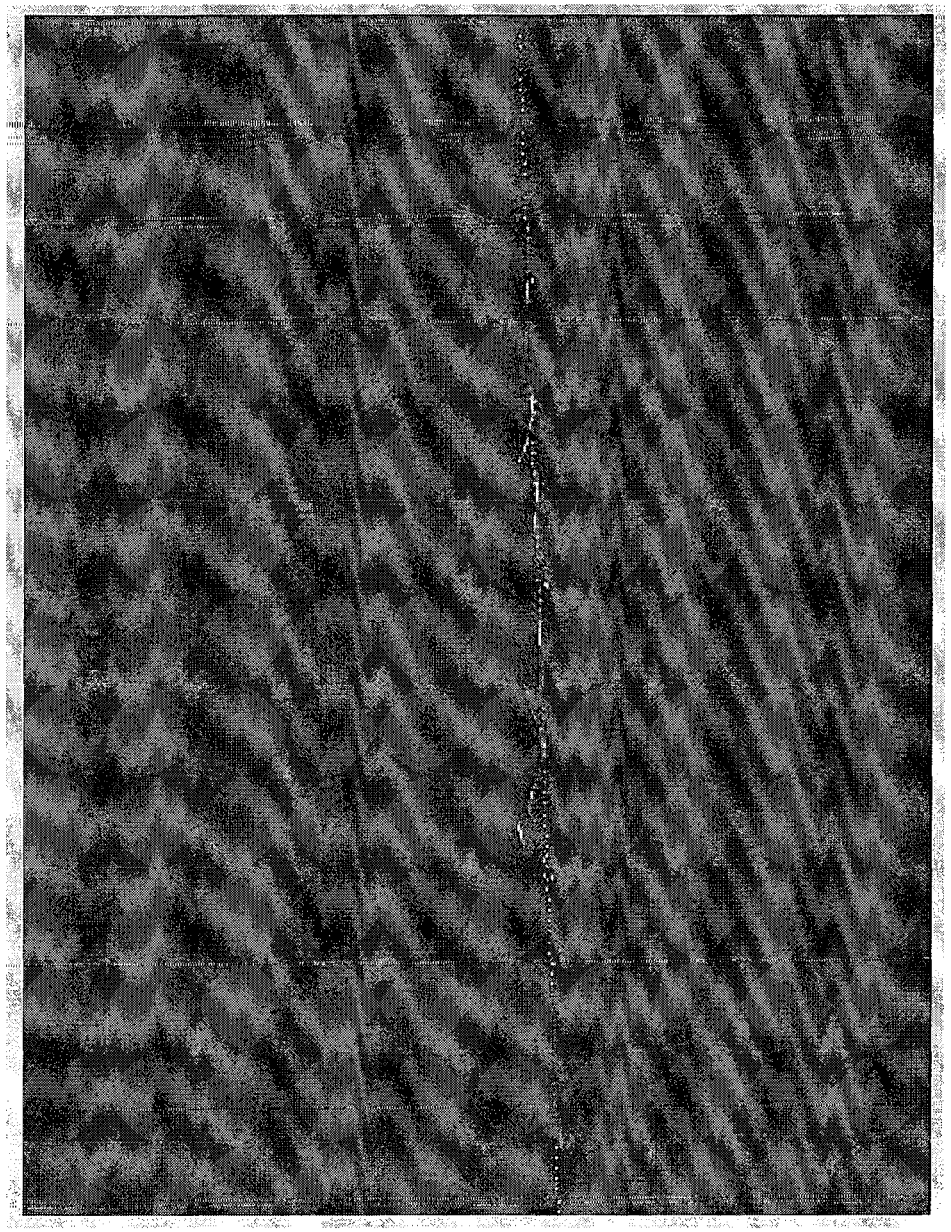
FIG. 11 illustrates position and directionality of a Radon line determined for the image of the laser lines, based on the Radon transform, in accordance with an embodiment of the present subject matter.

An example of the location of the detected straight line is indicated in FIG. 11. As with stage 2a, it should be noted that these lines (and the rest of stage 2b) are intended to be initial estimates and any errors should be corrected in stage 3. Note also that complete computation of the Radon transform is a relatively intensive task. However, as all the lines are expected to be nearly horizontal, it is only necessary to compute a small portion of Radon space—e.g. the strip of FIG. 12 between 80° and 100°.

The remaining steps are completed for each peak in Radon space. After a line is detected, rim estimation module 214 deletes a region of Radon space surrounding that peak to avoid detecting the same laser line twice. FIG. 11 illustrates position and directionality of a Radon line determined for the image of the laser lines, based on the Radon transform.

Next, rim estimation module 214 executes energy functional function for speeding up calculation and robustness of the system. A so-called "energy functional" is generated that gives the likelihood of a pixel being on the laser line based on its distance from the laser line. In an example, the form of the energy function can be assumed to be Gaussian:

$$E = |\nabla^2 I| \exp\left(\frac{-D^2}{2\sigma^2}\right)$$

where $\nabla^2$ denotes the Laplacian operator, $\sigma$ is the Gaussian standard deviation and D is the perpendicular distance of a pixel to the Radon line and is given by:

$$D = \frac{mX - Y + c}{\sqrt{m^2 + 1}}$$

In the above relation, m and c denote the gradient and intercept of the Radon line respectively and (X,Y) are the pixel co-ordinates. FIGS. 12a and 12b demonstrates the energy functional calculation. FIGS. 12a and 12b illustrate images showing distance between the Radon line and the laser line, a Laplacian for the laser line, and energy functional for the laser line, respectively.

Finally, rim estimation module 214 extracts final laser lines from corrected laser image. In this process, for each point on the Radon line, a perpendicular intensity profile of E is taken and the peak of this profile is assumed to be on the laser line. The directions of these profiles and the final estimate of the laser line are shown in FIGS. 13a and 13b. For completion, FIG. 14 show the laser lines captured in the completed multi-line system.

Rim estimate image and laser line image so produced by rim estimate module 214 together, are referred to as rim estimate image and are stored in the rim estimate data 222.

The rim estimate images obtained from rim estimation module 214 is used by alignment module 216. The alignment module 216 obtains the correct rim dimension or location or both, simultaneously calculating points of interest for determining rim alignment. The alignment module 216 performs following functions: rim correction and initial POI selection. Alignment module 216 aims to simultaneously correct the estimate of the rim location (and thus wheel centre) and locate the POIs in the image. Broadly speaking, the alignment module 216 extracts intensity gradient data along the estimated laser lines. Where peaks in the gradient occur (likely candidates for the rim location), an unconstrained ellipse is fitted.

Figure 15:
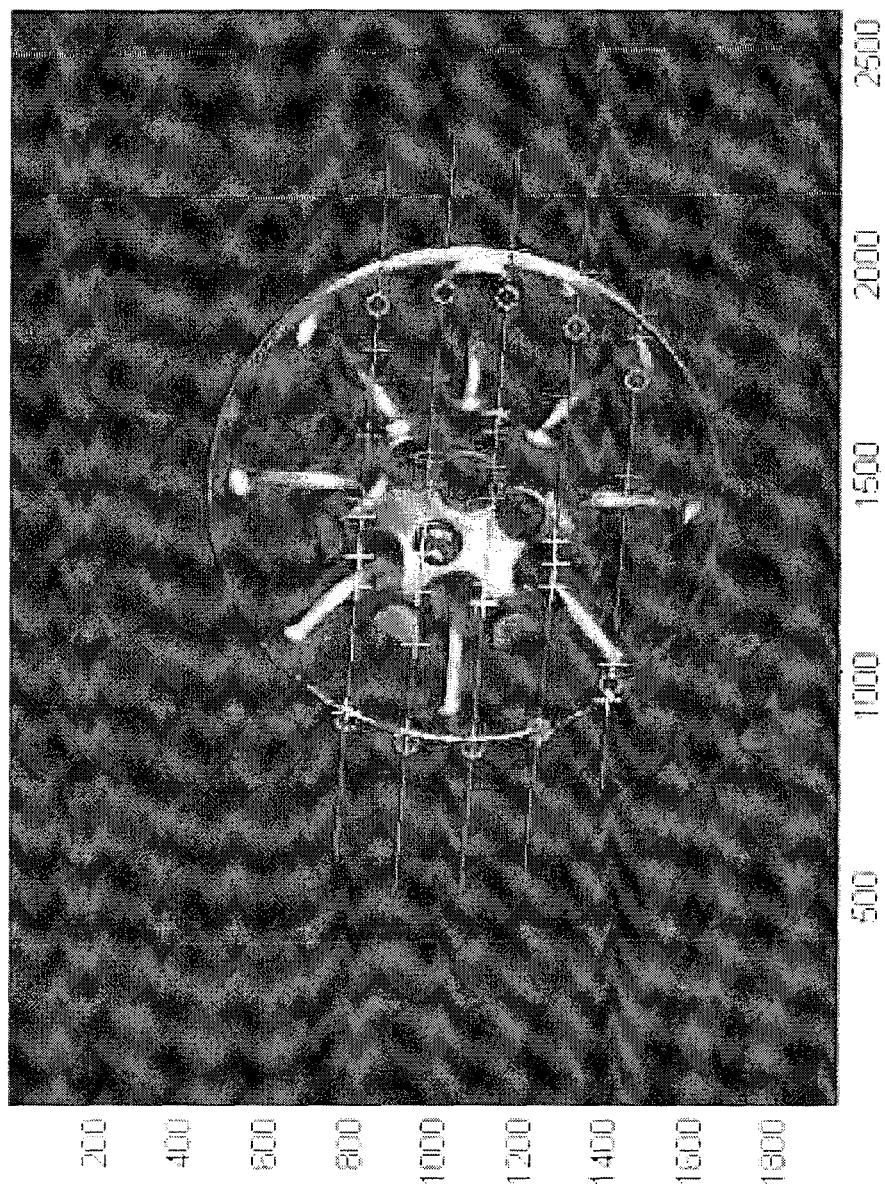
FIG. 15 illustrates a mode of correction of rim estimate, in accordance with an embodiment of the present subject matter.
Figure 16:
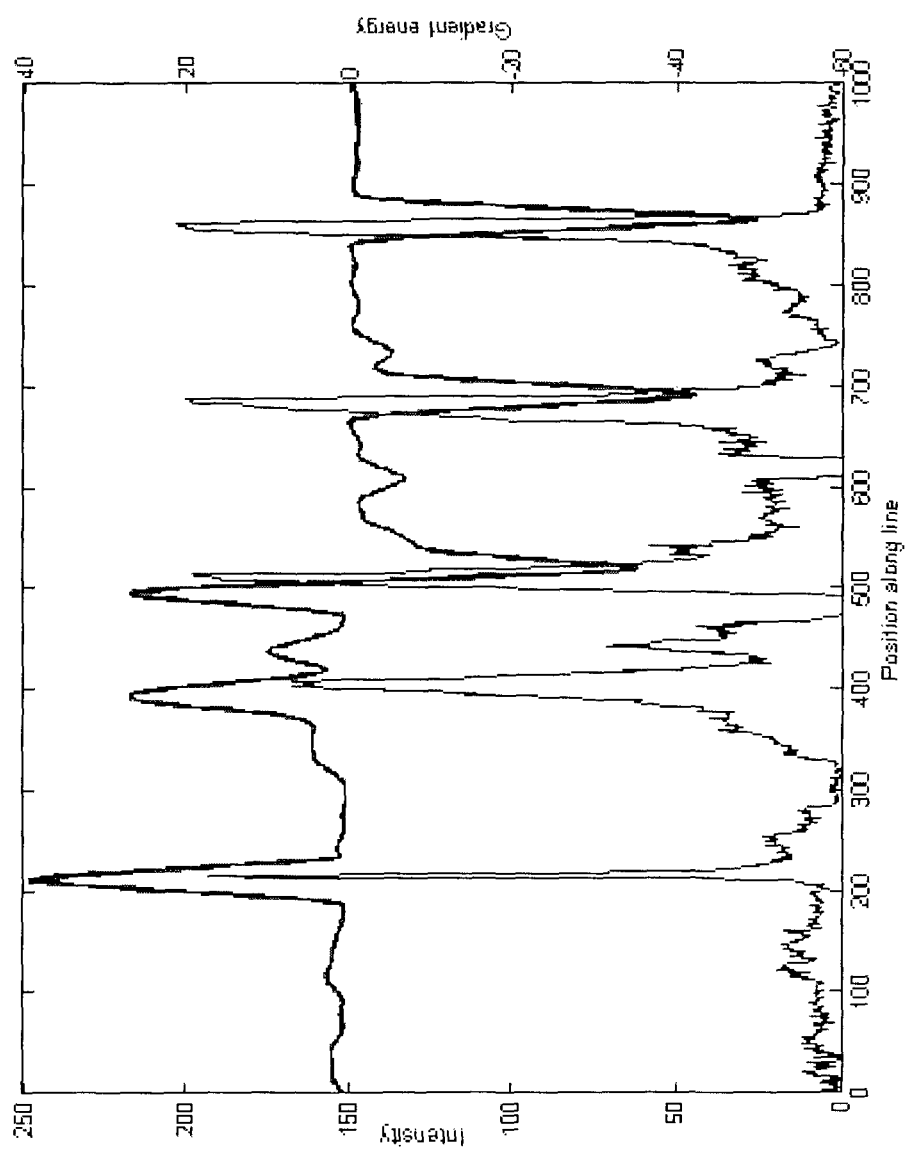
FIG. 16 illustrates a graph showing intensity profiles and gradient energy for the laser lines in the POI, in accordance with an embodiment of the present subject matter.

FIG. 15 shows the correction of rim estimate. The lines illustrate the lines along which intensity gradients are extracted, the circles indicate the intersections between the initial rim and initial laser line estimates, the crosses indicate candidates for left-hand POIs and right-hand POIs, the circles on the right hand side of the image indicate initial rim estimate (inner) and final estimate (outer).

Figure 18:
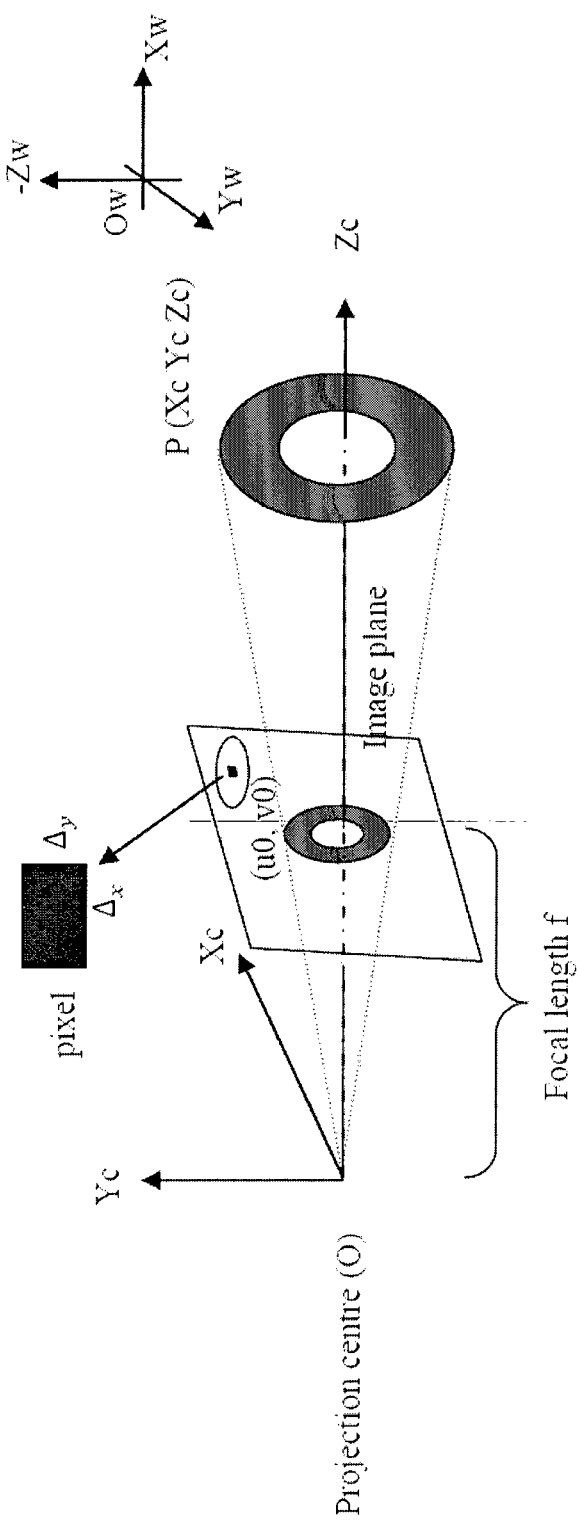
FIG. 18 illustrates a model for calibration of the image capturing system, according to an embodiment of the present subject matter.

FIG. 15 shows the image of the wheel with the laser lines (as a speed improving step, alignment module 216 replaces the laser line, at this point, by the straight line formed by the intersections of the initial rim estimate image from stage 2a and estimated laser lines from stage 2b). Initially, the intensity gradients are extracted along these lines. An example of intensity profiles and gradient energy for the top line is shown in FIG. 18. The five peaks in the profile clearly correspond to the five peaks in intensity along the line in FIG. 15.

According to the methodology, the alignment module 216 converts the intensity profile into a "gradient energy". Essentially, the gradient of the line is taken and smoothed using local averaging. The energy is defined to be negative for parts along the line to the right of the centre where the right-hand side of the rim is expected. Local peaks in this energy are then taken as candidates for the POI locations. These are shown as "+" signs in FIG. 15. It should be noted that local peaks in the gradient energy are assumed negligible if less than a fixed threshold. In an example, an arbitrary value of 5 is adopted for this threshold but there seems to be little sensitivity to the selected value. This step is followed by optimization of best rim estimate.

In an example, after candidate POIs are selected, optimization of the POIs is done by conducting the Nelder-Mead method. This aims to select the candidate points that best fit onto an ellipse. As an initial estimate, the outermost candidate points are adopted. Due to the relatively small number of points considered, convergence is usually very fast. The intended energy function to be minimized is given by $$E = \frac{\sum_i^N \epsilon_{Li} + \sum_j^N \epsilon_{Rj} + m}{\sum_k^N g_{Lk} + \sum_l^N g_{Rl}}$$

where N is the number of laser lines; $\epsilon_{Li}$ is the minimum distance between a candidate point on line i to the ellipse and similar for $\epsilon_{Rj}$, $g_{Lk}$ and $g_{Rl}$ and refer to the gradient energy at the candidate points: m is a mixing factor to indicate the relative importance of the gradient energy to the goodness of fit of the ellipse. It appears that a value of unity is adequate for m. However, it should not be zero; else the energy would drop to zero in the presence of a perfect ellipse, regardless of the gradient data. The importance of the optimization step in correcting the initial rim estimate to the final estimate is clarified in FIG. 5 by the two blue circles.

Figure 17:
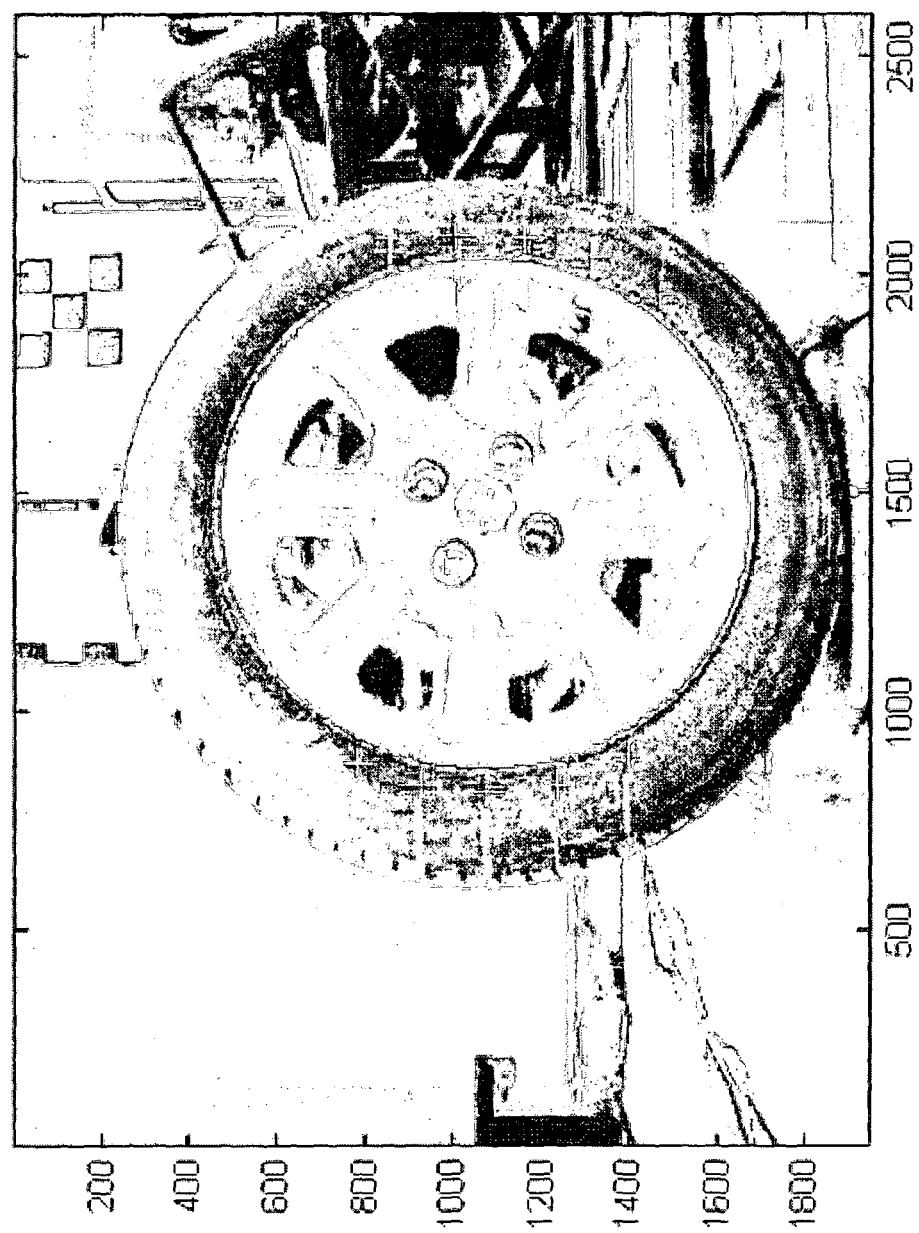
FIG. 17 illustrates final estimates of POIs in the image of the wheel, in accordance with an embodiment of the present subject matter.

In the final stage of the POI detection methodology, the alignment module 216 takes the points at a fixed distance away from the rim (this is tunable but typically 20 or so pixels). The intensity profile is then extracted around the ellipse formed by the new points and the peaks are simply assumed to be on the laser lines and taken to be the final POIs. An example the locations of the final estimates are shown in FIG. 17. This can be compared to the original estimate of the rim in FIG. 8.

The alignment module 216 determines at least one of a center of the rim and at least one point of interest (POI). This data is stored in the alignment data 224.

Before the alignment system 200 carries out the determination of the deviation of the wheels and aligns the wheels, the calibration module 210 achieves calibration of the wheel alignment apparatus 100 for achieving the deviation and the alignment with considerable accuracy. For example, the calibration module 210 achieves the calibration of image the capturing device 106 and lens, image capturing device 106 and laser triangulation and four pods systems. The final calibration results can be used to calculate the 3D coordinates of POI points for the determination of the orientation and position of the four wheels.

Functioning of calibration module 210 is explained in subsequent embodiments.

Given the lens and image capturing device selected, the camera system used for the image capturing device 106 is simplified by using a perspective pinhole model which characterizes the camera system through its optical projection centre and image plane as shown in FIG. 18.

The physical dimension coordinate (x, y, 1) of the projected point corresponds to its image pixel coordinate (u, v, 1) through:

$$\begin{pmatrix} u \\ v \\ 1 \end{pmatrix} = \begin{bmatrix} 1/\Delta_x & 0 & u_0 \\ 0 & 1/\Delta_y & v_0 \\ 0 & 0 & 1 \end{bmatrix} \begin{pmatrix} x \\ y \\ 1 \end{pmatrix}$$

Where $\Delta_x$ and $\Delta_y$ are the pixel size in horizontal and vertical direction, $u_o$ and $v_o$ are the pixel's coordinate of projection centre in the image.

The relationship between the space point (P) on the object and their projection (p) in the image plane under the camera frame can be written as:

$$Z_c \begin{pmatrix} x \\ y \\ 1 \end{pmatrix} = \begin{bmatrix} f & 0 & 0 & 0 \\ 0 & f & 0 & 0 \\ 0 & 0 & 1 & 0 \end{bmatrix} \begin{pmatrix} X_c \\ Y_c \\ Z_c \\ 1 \end{pmatrix}$$

Therefore, the 3D representation of the object and its image pixel coordinate can be linked through the following equation:

$$Z_c \begin{pmatrix} u \\ v \\ 1 \end{pmatrix} = \begin{bmatrix} \frac{1}{\Delta_x} & 0 & u_0 \\ 0 & \frac{1}{\Delta_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{pmatrix} X_c \\ Y_c \\ Z_c \\ 1 \end{pmatrix} = \begin{bmatrix} \alpha_x & 0 & u_0 & 0 \\ 0 & \alpha_y & v_0 & 0 \\ 0 & 0 & 1 & 0 \end{bmatrix} \begin{pmatrix} X_c \\ Y_c \\ Z_c \\ 1 \end{pmatrix}$$

The $\alpha_x$, $\alpha_y$, $u_o$, and $v_o$ are four basic parameters to characterize the image capturing device and lens system. Due to the difficulty in obtaining the coordinates in the camera reference frame, the image capturing device calibration normally employs some standard objects which have makers with known relative locations to be used as a world coordinate system. The general world coordinate frame and camera reference frame can be linked through a transformation composed by a rotation R and a translation vector T:

$$\begin{pmatrix} X_c \\ Y_c \\ Z_c \\ 1 \end{pmatrix} = \begin{bmatrix} R & t \\ 0 & 1 \end{bmatrix} \begin{pmatrix} X_w \\ Y_w \\ Z_w \\ 1 \end{pmatrix}$$

Therefore the object location under the world coordinate reference frame and its projection in the image has the following relationship:

$$Z_c \begin{pmatrix} u \\ v \\ 1 \end{pmatrix} = \begin{bmatrix} \alpha_x & 0 & u_0 & 0 \\ 0 & \alpha_y & v_0 & 0 \\ 0 & 0 & 1 & 0 \end{bmatrix} \begin{bmatrix} R & t \\ 0 & 1 \end{bmatrix} \begin{pmatrix} X_w \\ Y_w \\ Z_w \\ 1 \end{pmatrix}$$

The transformation (rotation and translation) between camera frame and world coordinate frame is also called the external parameters when doing the image capturing device calibration.

Figure 19:
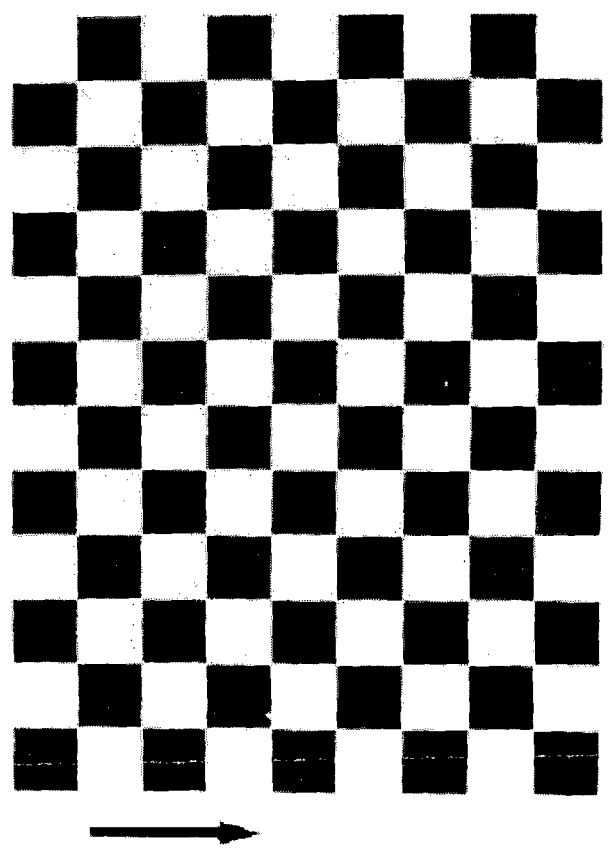
FIG. 19 illustrates an object for calibration of the image capturing system, according to an embodiment of the present subject matter.
Figure 20:
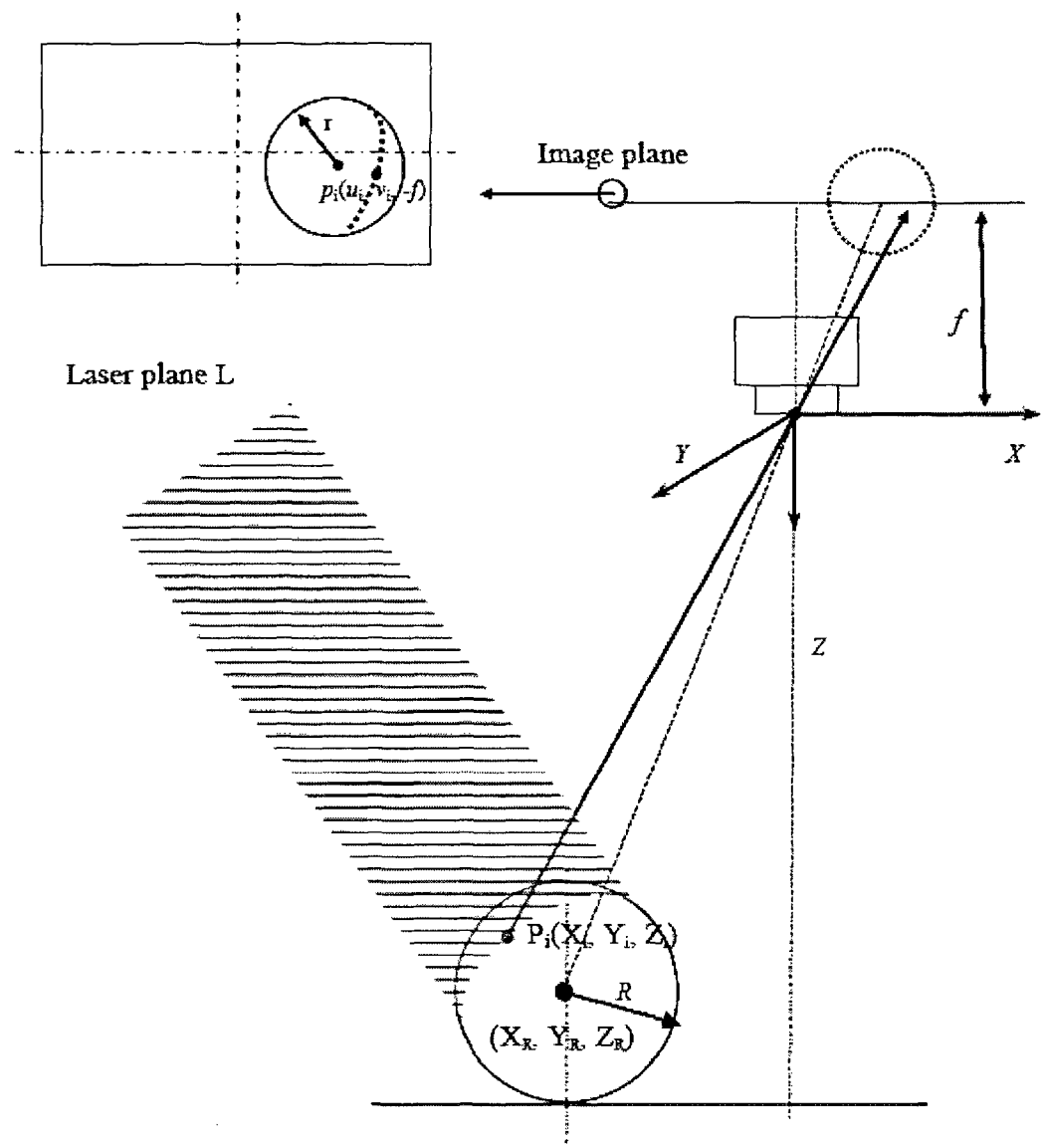
FIG. 20 illustrates a laser triangulation methodology for calibration of the image capturing system, according to an embodiment of the present subject matter.

Approach of calibration module 210 is based on planar objects are mostly used because of the convenience and cost-effectiveness. The marker pattern can be designed into different special shapes for easily and accurately locating features. In an example, the printed checkerboard shown in FIG. 19 can be used for image capturing device calibration in the project. Theoretically two images of planer board taken at different positions are enough for calibration, but more images involved should be helpful for improving the robustness and accuracy of the calibration.

Following table summarizes the calibration for four image capturing devices used in the project.

TABLE 1

Image capturing device parameters

| Par | image |  |  |  |
|---|---|---|---|---|
|  | 1 | 2 | 3 | 4 |
| Focal length | [3718.59, 3718.76] | [3691.97, 3700.04 | [3731.81, 3729.94 | [3715.59, 3715.53 |
| Principal | [1240.36, 976.74] | [1253.84, 768.15] | [1132.76, 749.83] | [1281.15, 1109.31 |
| Distortion | [−0.23, 0.25, 0.00] | [−0.24, 0.27, —  | [−0.23, 0.31, −.004] | [−0.23, 0.14, 0.00] |

Figure 22:
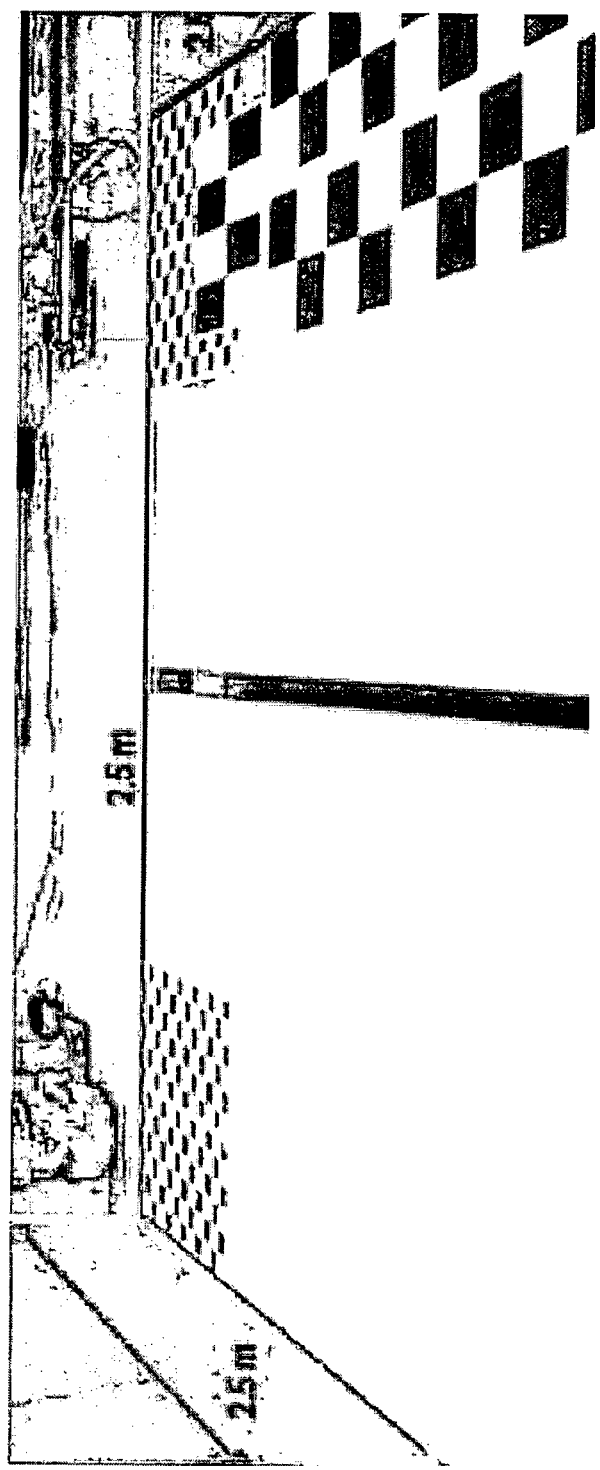
FIG. 22 illustrates a plane with markers for calibrating the image capturing system, in accordance with an embodiment of the present subject matter.

The above mentioned data is referred as calibration data 218. According to the relations provided above, two equations can be generated for 3D position of a surface point under camera reference frame or world coordinate frame. Extra information is still required for determining the 3D position (three variables) of a space point. Several strategies such as stereo vision and coded pattern projection approaches could be used, though a structured laser line approach is determined for this project considering the high intensity of the laser over the environmental lighting condition and darkness of wheel surface. The principle of the laser line triangulation is shown in FIG. 22.

Further, laser line(s) generated from a laser beam project onto the surface of the measured object (here is the wheel tyre). The shape or depth of the surface can be determined by substituting the projection image of the intersection lines into the model of calibrated image capturing device (i.e. equation (8) or (10)), and the model of laser plane to be calibrated.

By fixing the position of structured laser lines relative to the camera system 106, the measurement will only focus on the intersection part of laser line and object surface. This simplification assumes that the strip of laser can be modeled through a plane with known location and orientation under some world coordinate system.

In this project the laser plane to be established under the camera frame is represented as a general plane equation:

$$aX_i + bY_i + cZ_i + d = 0$$

The magnitude of the plane coefficients [a, b, c, d] is unit.

To determine the laser plane, an object with known shape and dimension is used to find the 3D locations of the laser lines. Spherical objects such as the one shown in the above figure are preferably employed as they can be manufactured with enough accuracy.

Providing the physical size of the sphere and image capturing device internal parameters are known and the distance between the sphere and image capturing device is much larger than the dimension of the sphere i.e. diameter of sphere, calibration module 210 calculates the approximate working distance (the location of the sphere) through following procedure. Calibration module 216 determines the sphere centre ($u_r$, $v_r$) and its radius (r) within the image plane through a semi-automatic circle fit routine function. As the physical dimension of the sphere (radius R) is known, the location (centre) of the sphere in the camera reference coordinate system can be calculated as follows.

$$X_R = u_r * \frac{R}{r};\ Y_R = v_r * \frac{R}{r};\ Z_R = f * \frac{R}{r};$$

Similarly, calibration module 210 is able to calculate the 3D position (Xi Yi Zi) of laser coordinate on the sphere through finding the intersection of laser line with the sphere surface. The projection line of the laser strip in the image can be identified and isolated using image process techniques. The location of the point $p_i$ is a result of a line, which goes through the point $p_i(u_i, v_i, -f)$ on the image plane and the origin point of the camera coordinate system, intersecting with the sphere. Its coordinates can be calculated from the following equations:

$$\frac{X_i}{u_i} = \frac{Y_i}{v_i} = \frac{Z_i}{f}$$

$$(X_i - X_R)^2 + (Y_i - Y_R)^2 + (Z_i - Z_R)^2 = R^2$$

After the 3D positions of at least three laser coordinate on the sphere are obtained, the calibration module 210 performs the step wherein the laser plane can be fitted through these coordinate by using the singular Value Decomposition (SVD) or orthogonal regression methodology to find the least mean solution for a bundle of linear equations. Though more coordinate involved in fitting could improve the accuracy, it should not use extreme large number of coordinate which may cause a problem in allocating the memory for computation. FIG. 23 shows the laser lines of Pod 1 projected onto the sphere for this project and the corresponding calibration result of the laser planes.

l1=[0.1421 −2.4009 0.6133 999.9969];

l2=[0.1082 −2.4624 0.7289 999.9967];

l3=[0.1004 −2.4577 0.8555 999.9966];

l4=[0.1013 −2.4479 0.9864 999.9965];

l5=[0.1070 −2.4756 1.1223 999.9963];

From the equations above, the uncertainty of the calculated 3D coordinates will depend on internal parameters of the image capturing device 106, extracted laser features (image coordinates) and the calibrated parameters 218 of laser plane. When the image capturing device 106 and lens are fixed, depth of view (or the working distance) is roughly fixed too according to the Gaussian equation of a thin lens. To improve the accuracy of a triangulation system performed by calibration module 218, one effective way is to increase the distance (also called as the base line) between laser 110 and image capturing device 106. Otherwise, if the value is too small, the system 200 especially in depth direction will be very sensitive to the image noise.

In order to evaluate the condition of a large object like four wheel car, the individually calibrated pod system 102 should be unified into one general reference frame.

To employ a frame visible to all four pods may be presented as a straightforward approach. The four pods 102 will be linked together through the special markers or targets whose relative positions are known. FIG. 22 shows one example of such frame where the patterns are checkboard markers sticking on the flat surface. As the flat surface is easy to achieve and the location of check board is a 2D problem, this approach can be setup with certain accuracy, though the assembling and the weight of this frame may limit its applicability.

Figure 23A:
FIGS. 23a and 23b illustrates a frame of the wheel alignment system for mounting the image capturing system, according to an embodiment of the present subject matter.
Figure 23B:
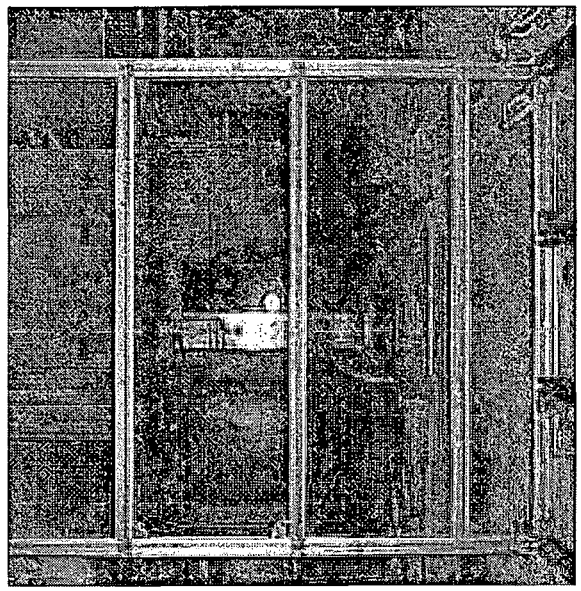

As a level plane either from floor or suspension platform is available when a wheel alignment is performed, it's possible to avoid building and setup such a big frame by making use of the floor or platform. FIG. 23a and FIG. 23b demonstrate one example of the approach, where two of the four structured edges of the platform are treated as the axis of the world coordinate system in the workshop. A portable vertical frame is purposely built with some special markers whose relative positions are known within the portable frame. By positioning the portable frame around four corners, four pods can be linked with the level frame of the platform.

The transformation between the portable frame and camera reference frame can be achieved through the given 3D location of the makers and a semi-automatic approach to pick up the image coordinates of the makers. The 3D location of the markers relative to the platform should be available in prior.

Figure 24:
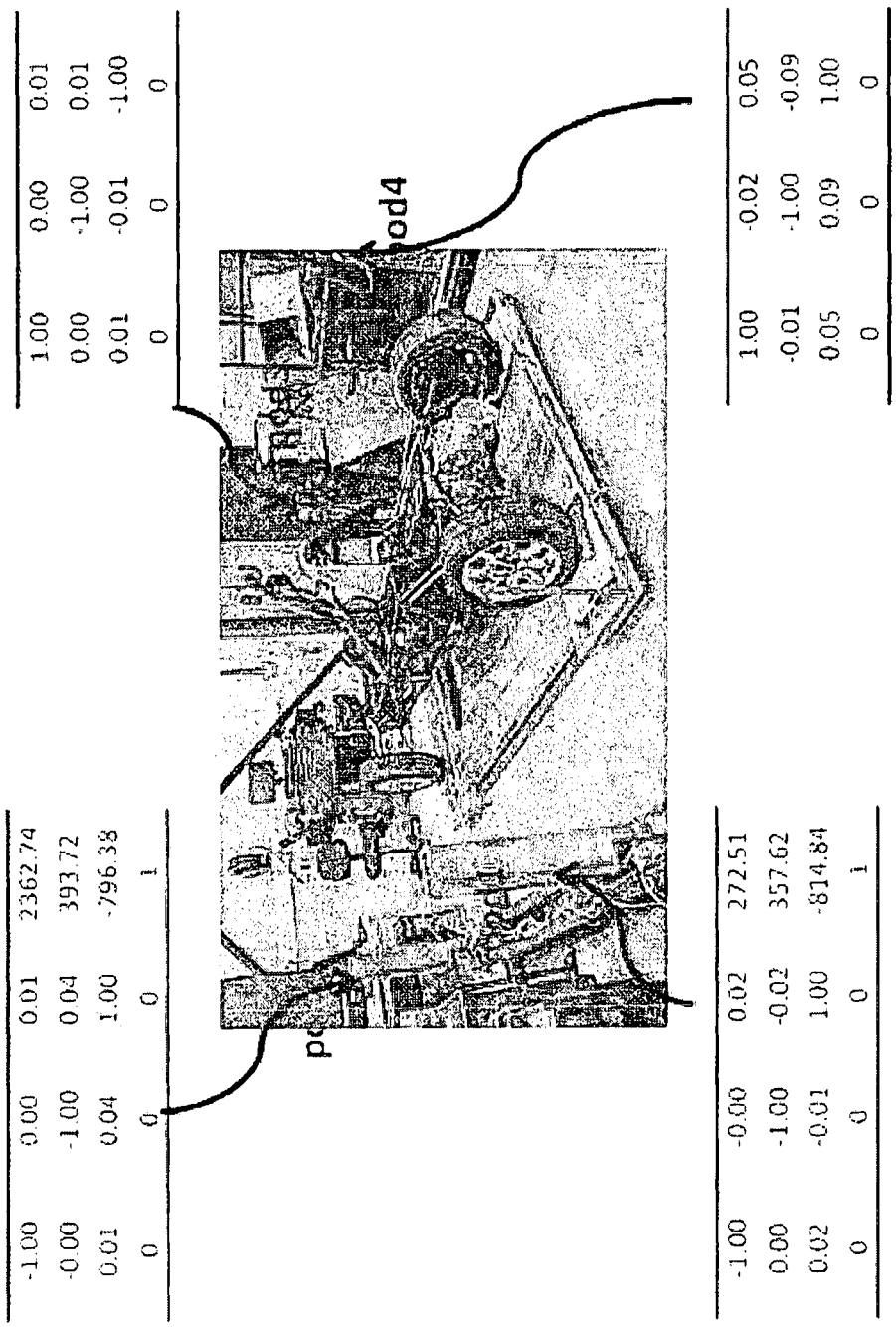
FIG. 24 illustrates a setup of the wheel alignment system for checking alignment of wheels of a vehicle, in accordance with an embodiment of the present subject matter.
Figure 25:
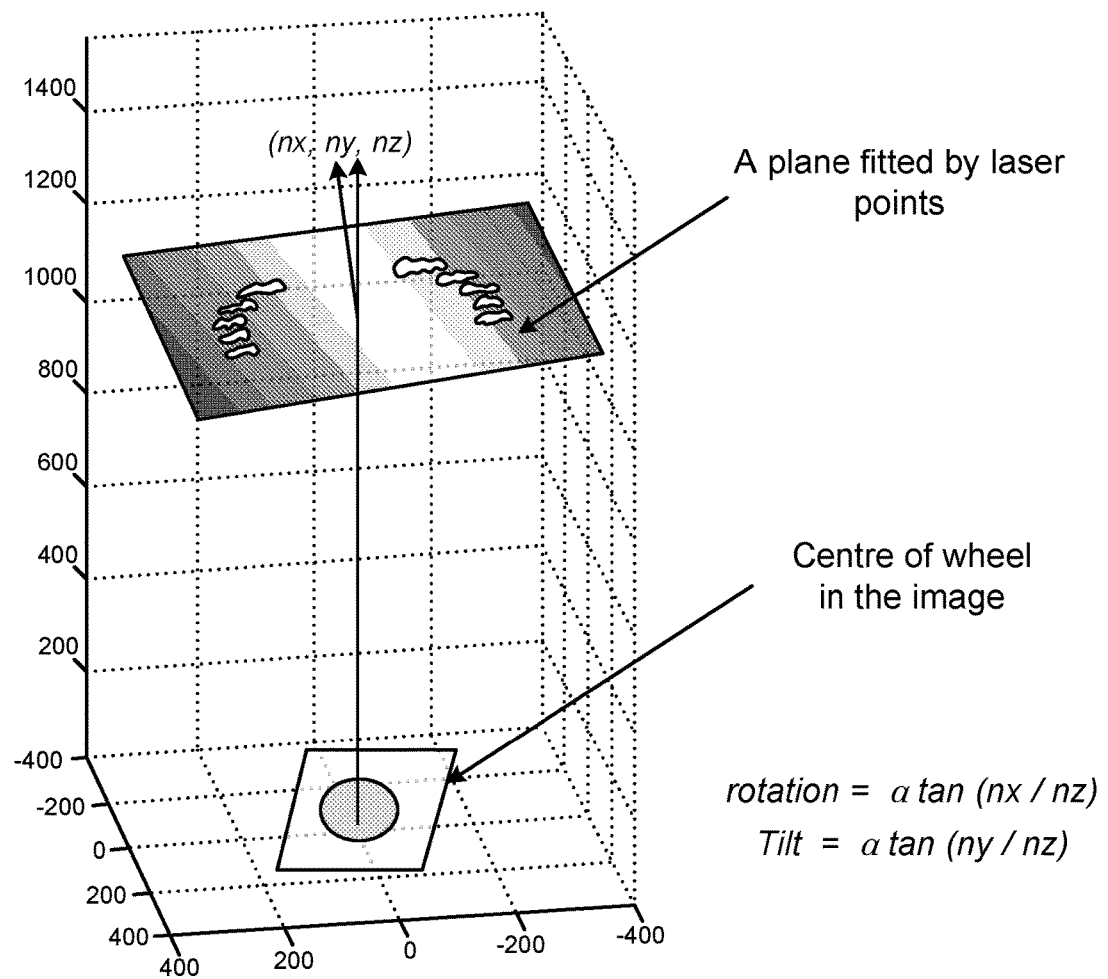
FIG. 25 illustrates a plane representation of the wheel of the vehicle, according to an embodiment of the present subject matter.

FIG. 24 shows the calibration results 218 (transformation between the platform and four pods). Based on the transformations acquired, it's easy to unify a reference coordinate system with any one of the four pods for the following necessary alignment task.

After the five pairs of Points Of Interest (POIs) near the rim have been extracted from the image processing methodology, alignment module 216 computes the 3D coordinates of these points according to the parameters of the calibrated image capturing device 106 and the laser planes. Assuming the points are equally distributed around the rim, alignment module calculates a theoretical plane through these points by using the same to laser plane fitting approach to represent the wheel. Therefore the position and orientation of the wheels for the alignment tasks will be calculated through the representation of these planes. The following figure shows an example of the left rear wheel with regard to the pod 1 system.

Figure 27:
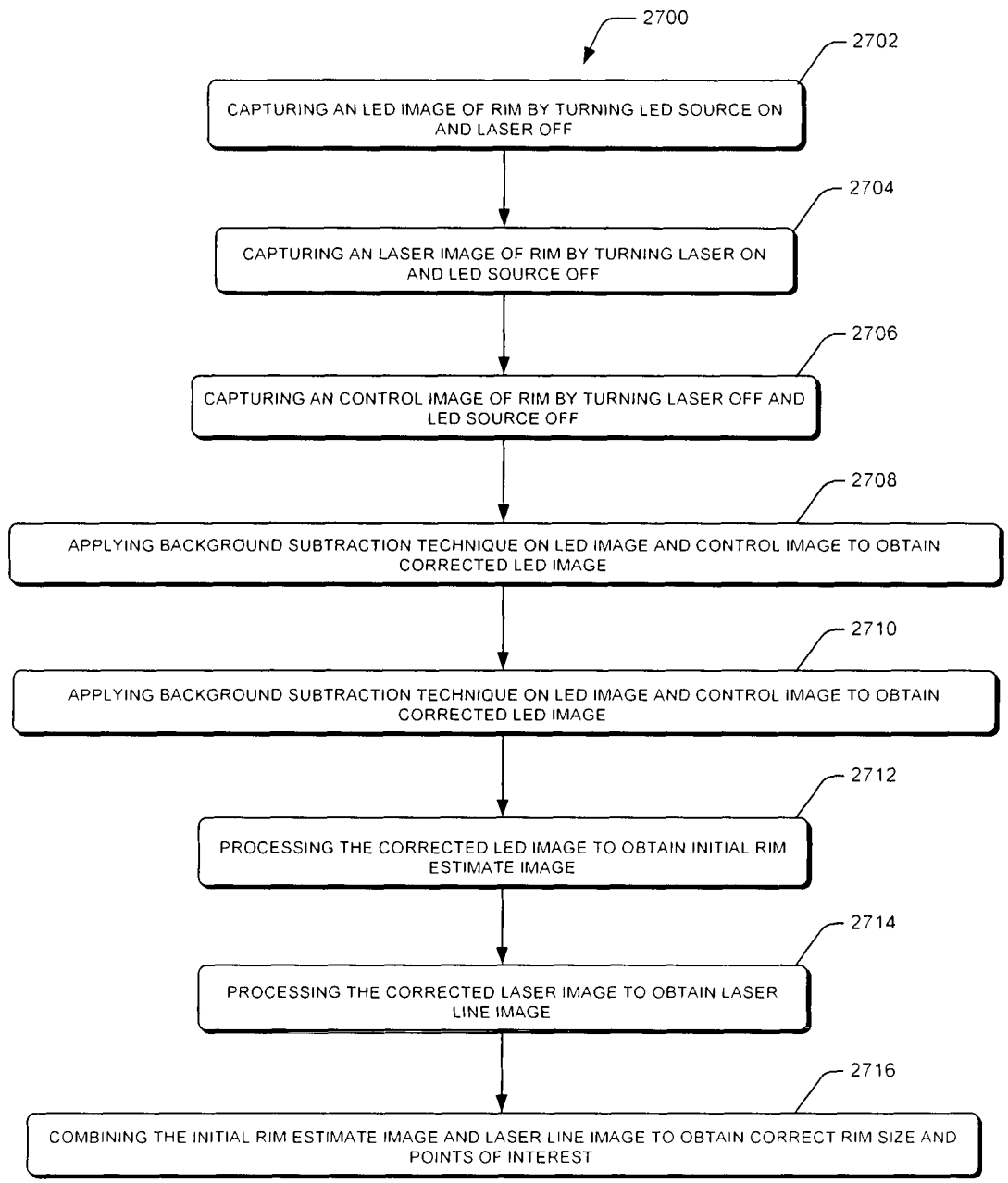
FIG. 27 illustrates a method for image processing for wheel alignment, in accordance with an embodiment of the present subject matter.
Figure 28A:
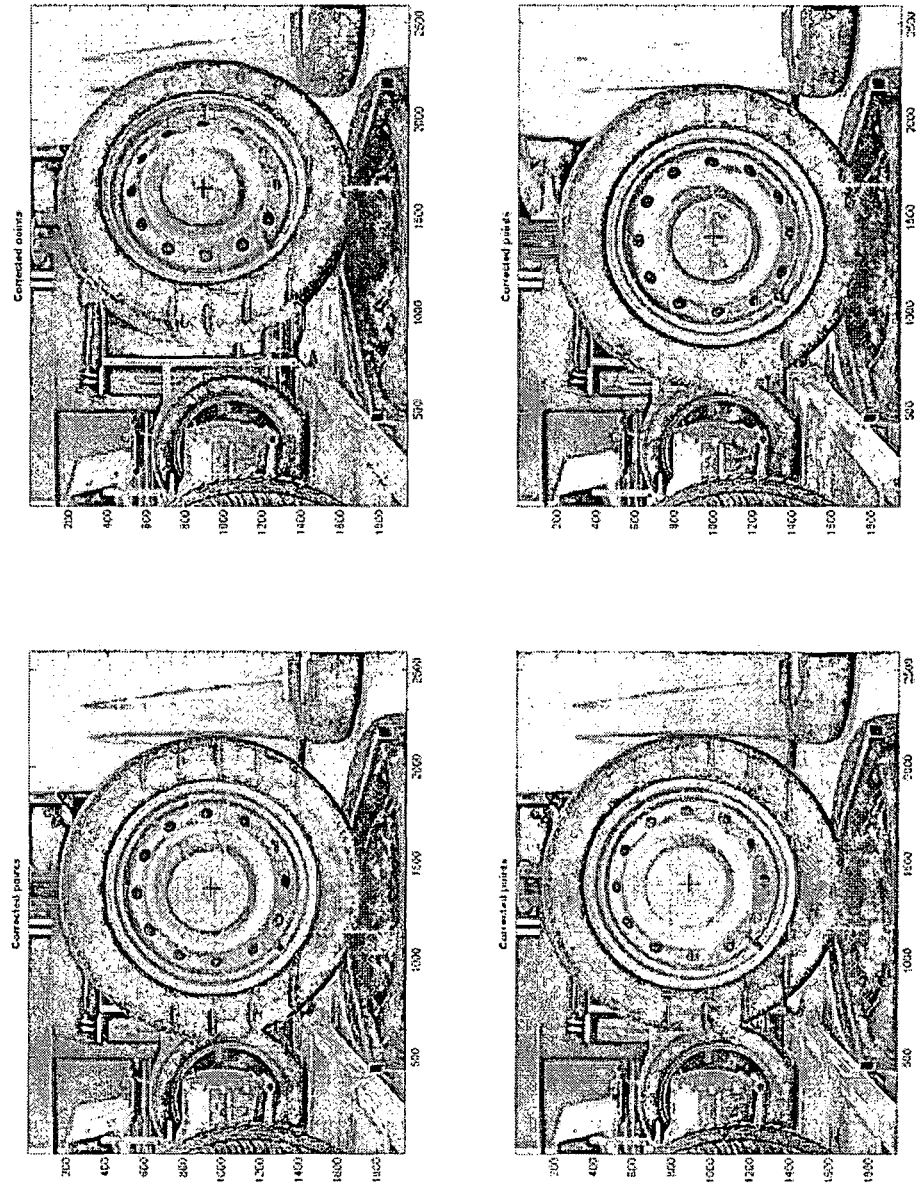
FIGS. 28a and 28b illustrates results of wheel rim estimates for a steel rim, according to an embodiment of the present subject matter.
Figure 28B:
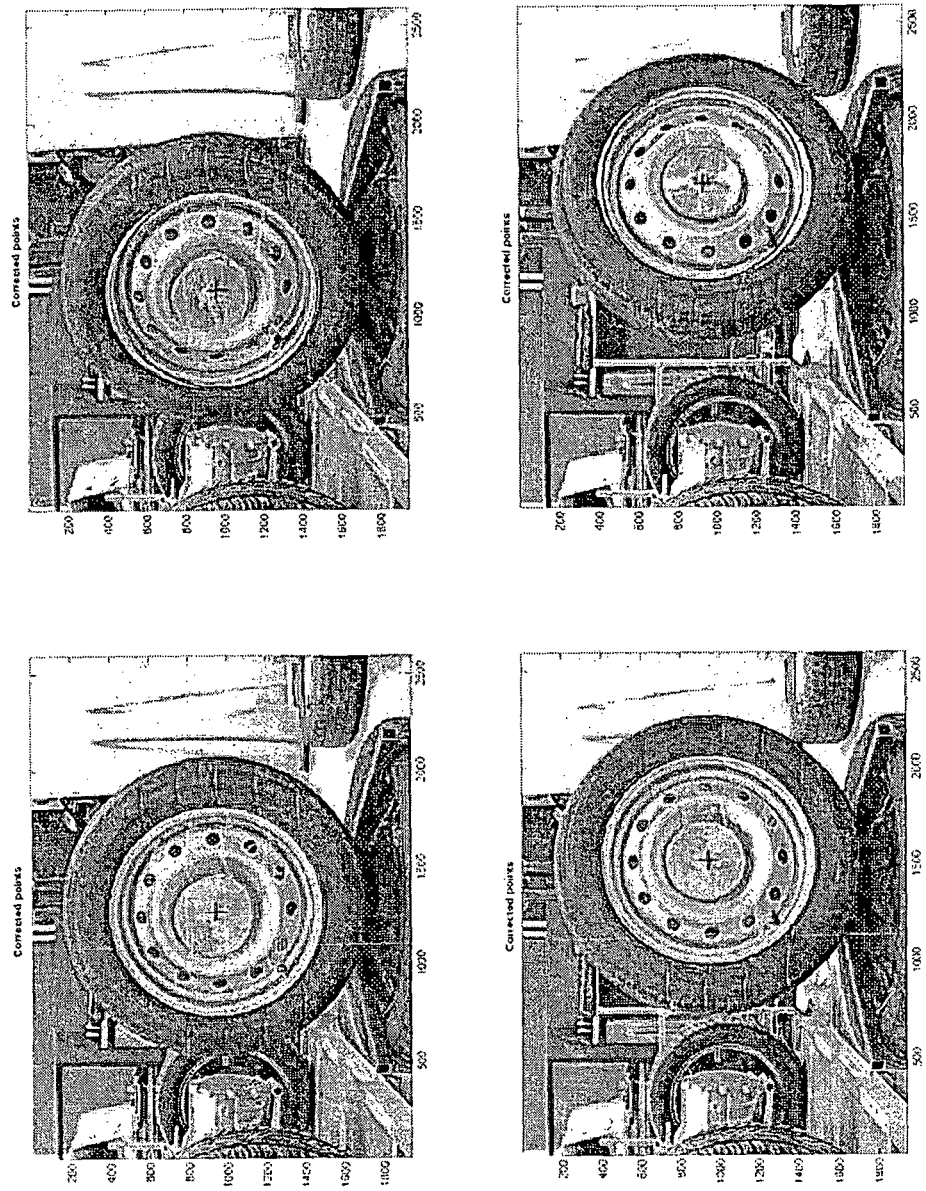
Figure 29A:
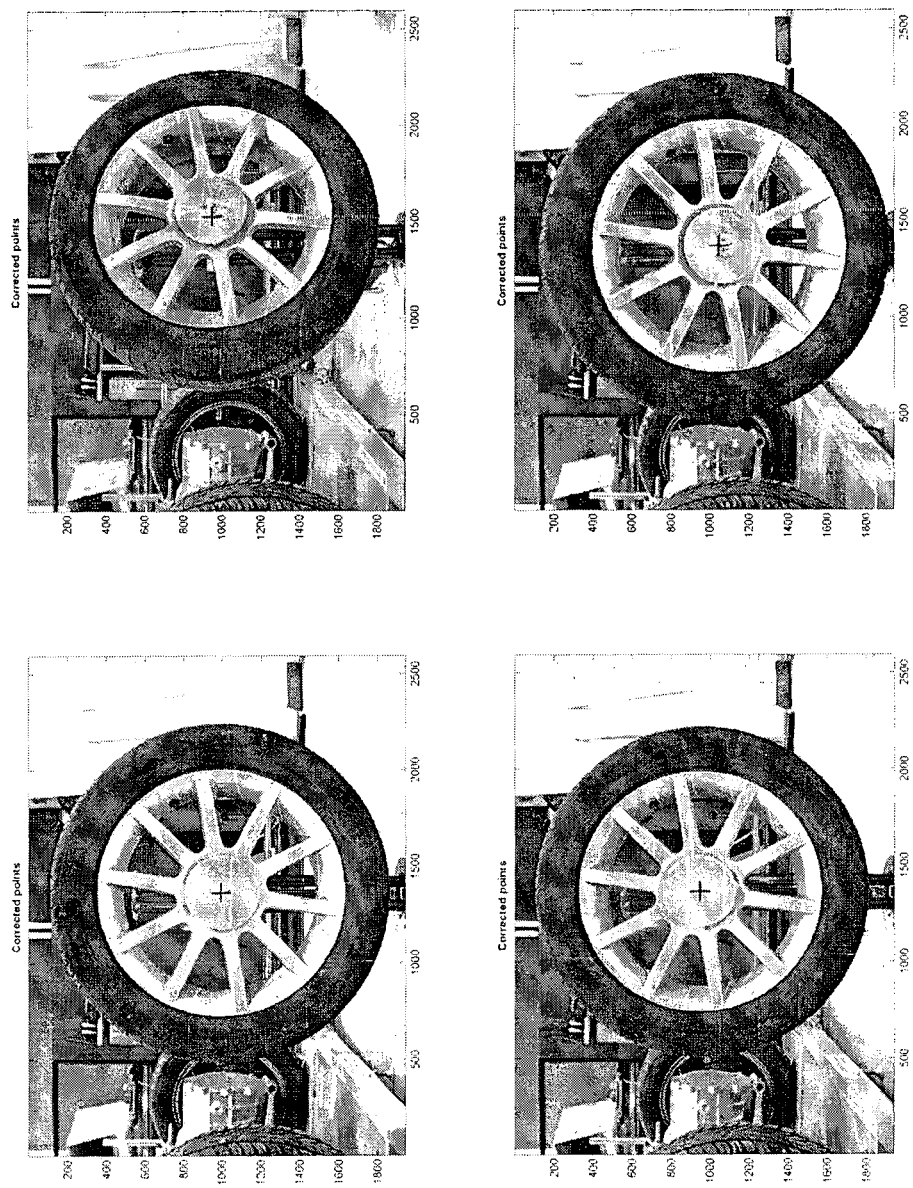
FIGS. 29a and 29b illustrates results of wheel rim estimates for an alloy rim, according to an embodiment of the present subject matter.
Figure 29B:
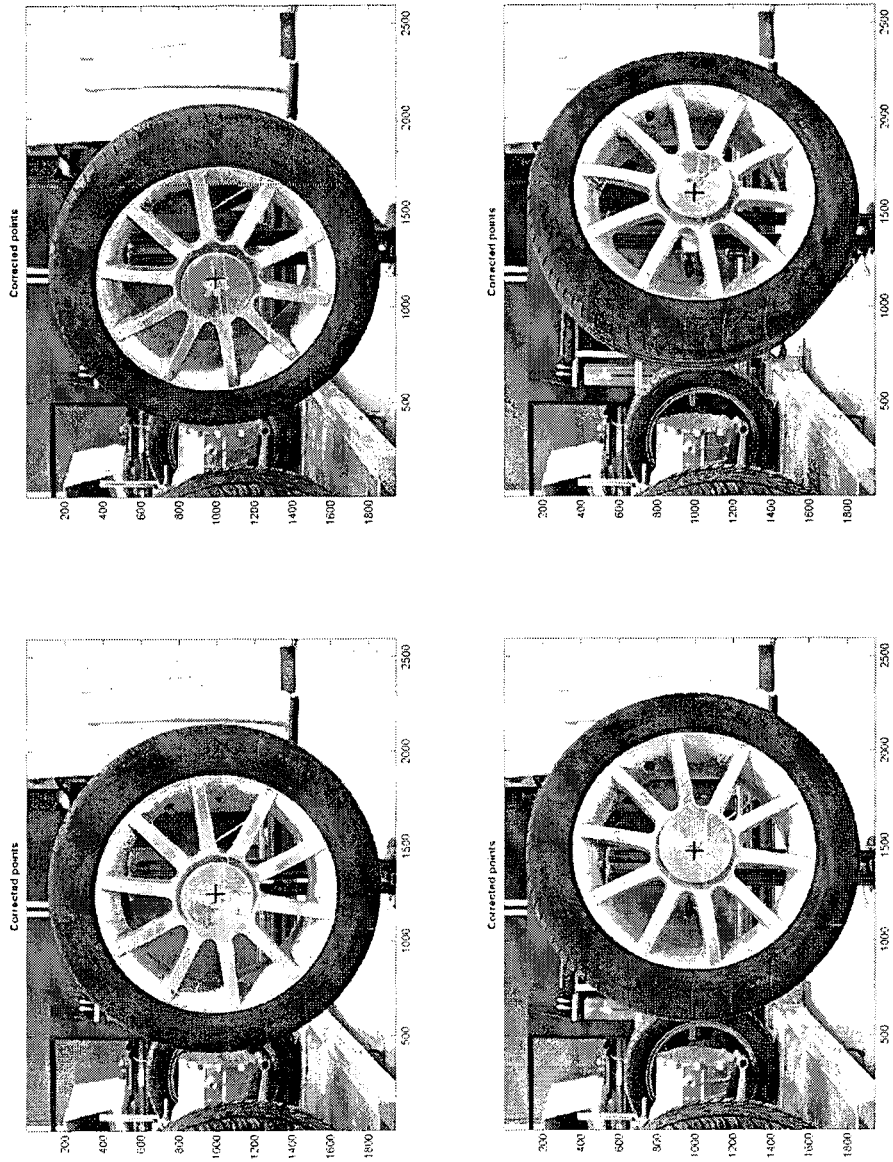
Figure 30A:
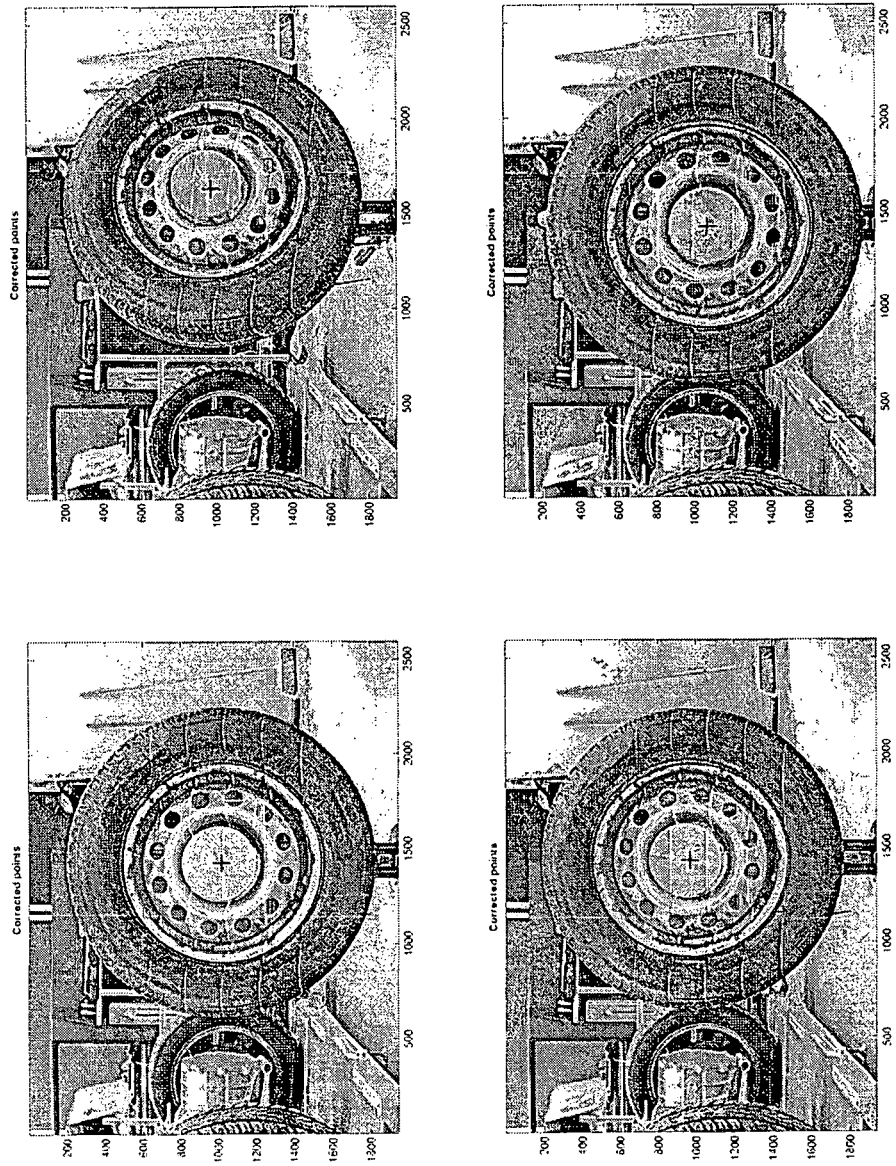
FIGS. 30a and 30b illustrates results of the wheel rim estimates for a rusty rim, according to an embodiment of the present subject matter.
Figure 30B:
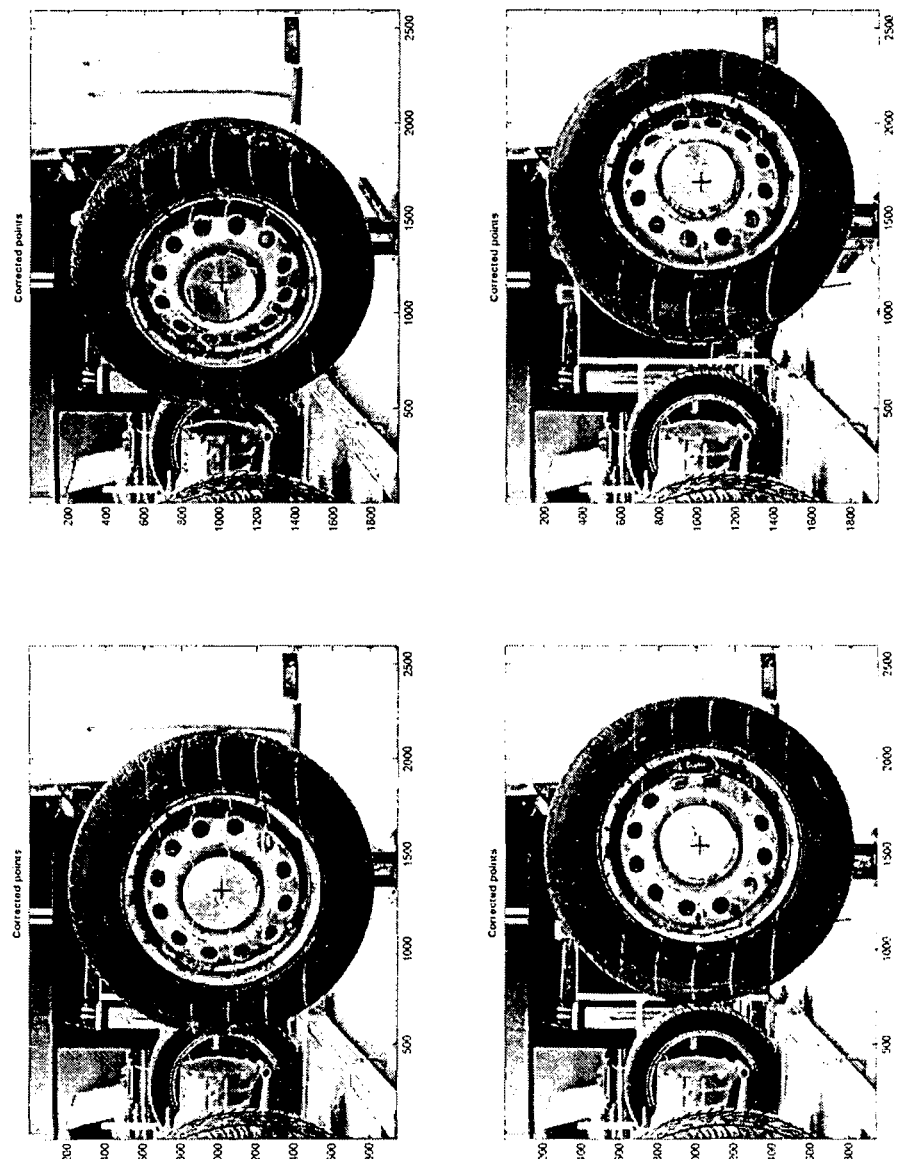
Figure 31A:
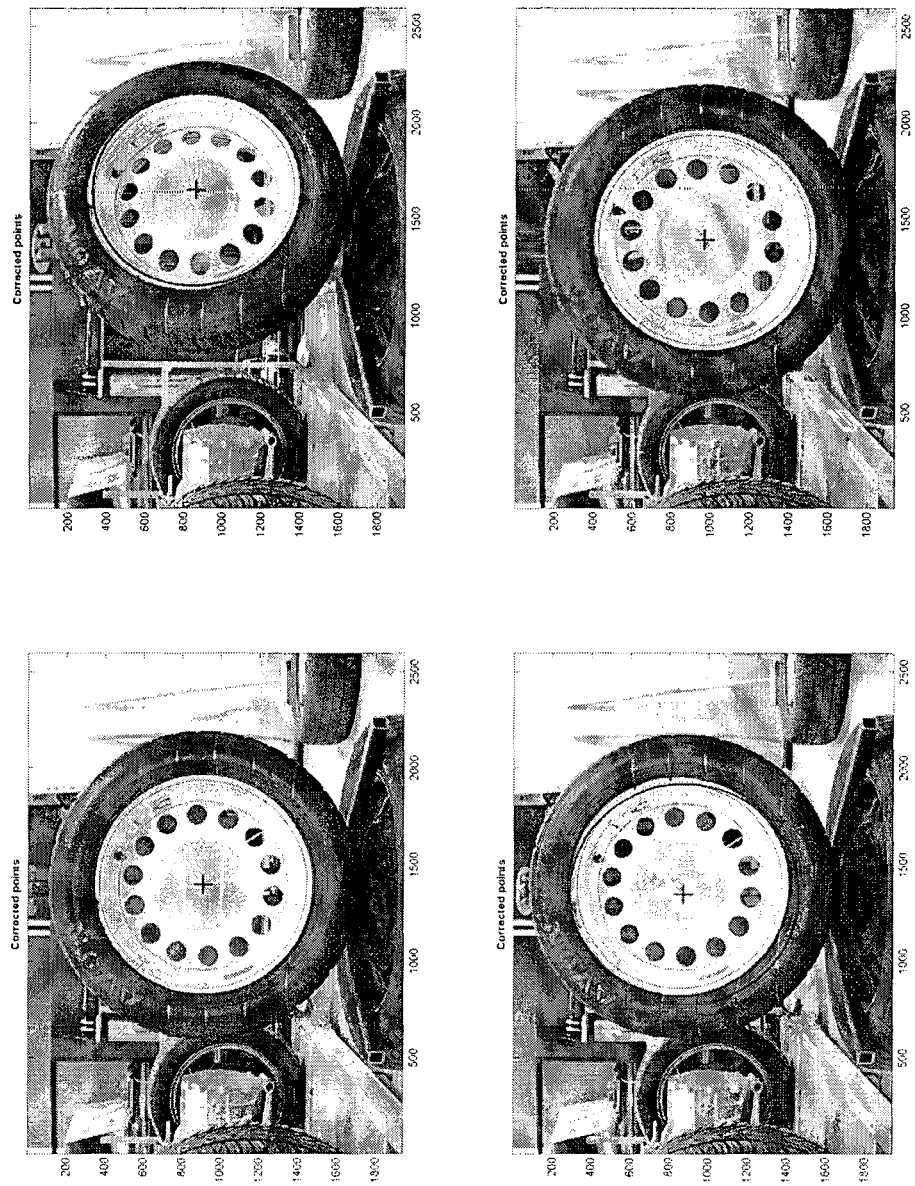
FIGS. 31a and 31b illustrates results of the wheel rim estimates for a wheel rim of a racing car, according to an embodiment of the present subject matter.
Figure 31B:
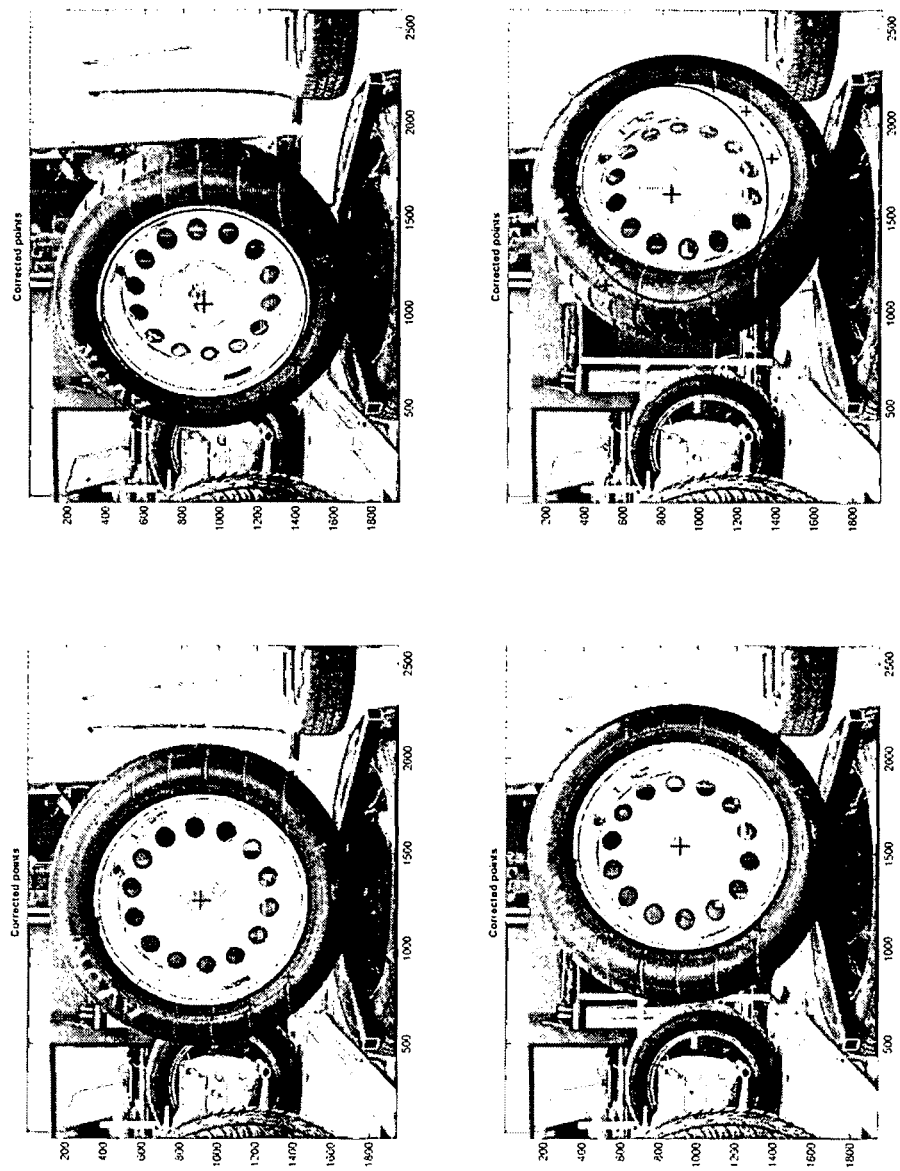
Figure 32A:
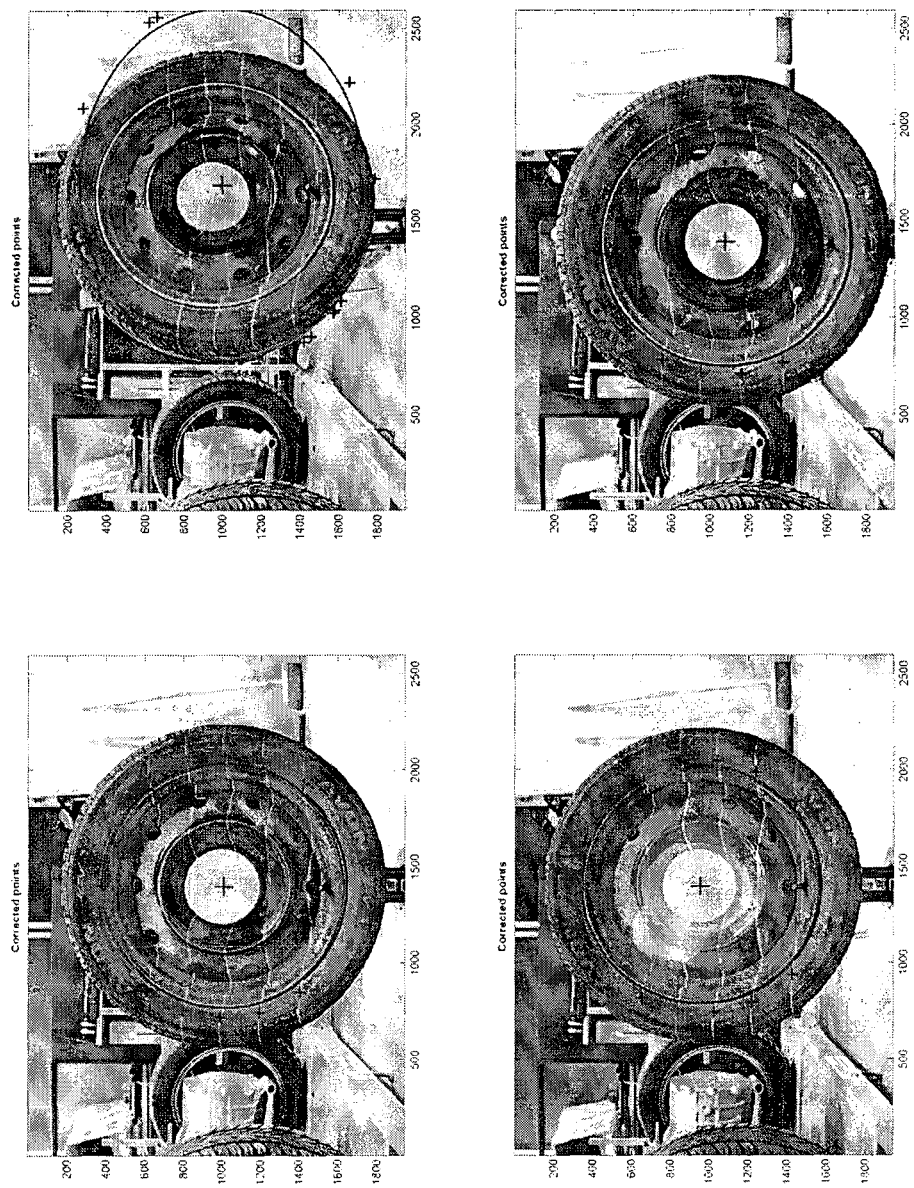
FIGS. 32a and 32b illustrates results of the wheel rim estimates for a black-coloured rim, according to an embodiment of the present subject matter.
Figure 32B:
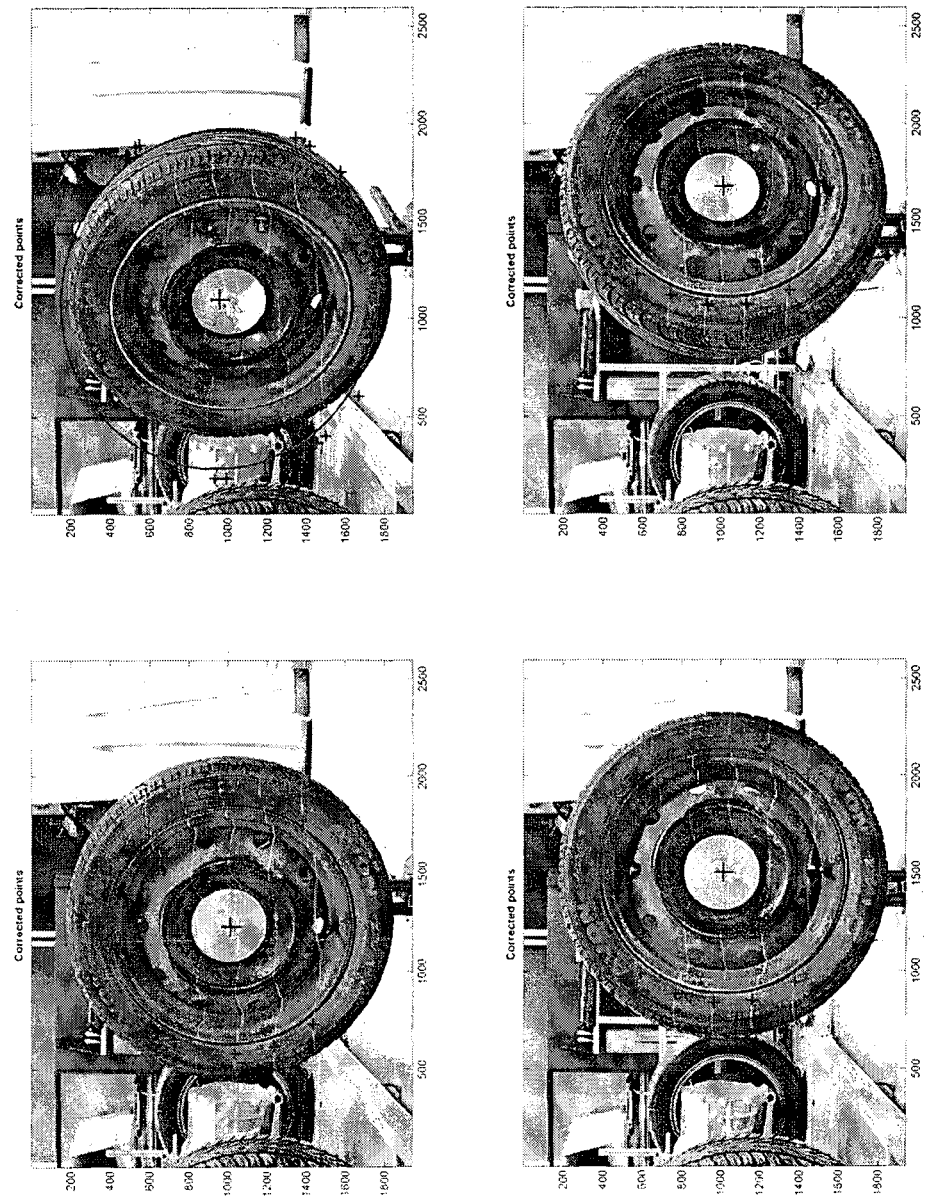

FIG. 27 illustrates a plane representation of the wheel (location and orientation). Note that the rotation and tilt angles are calculated respect to the platform frame in the above figure.

Figure 26:
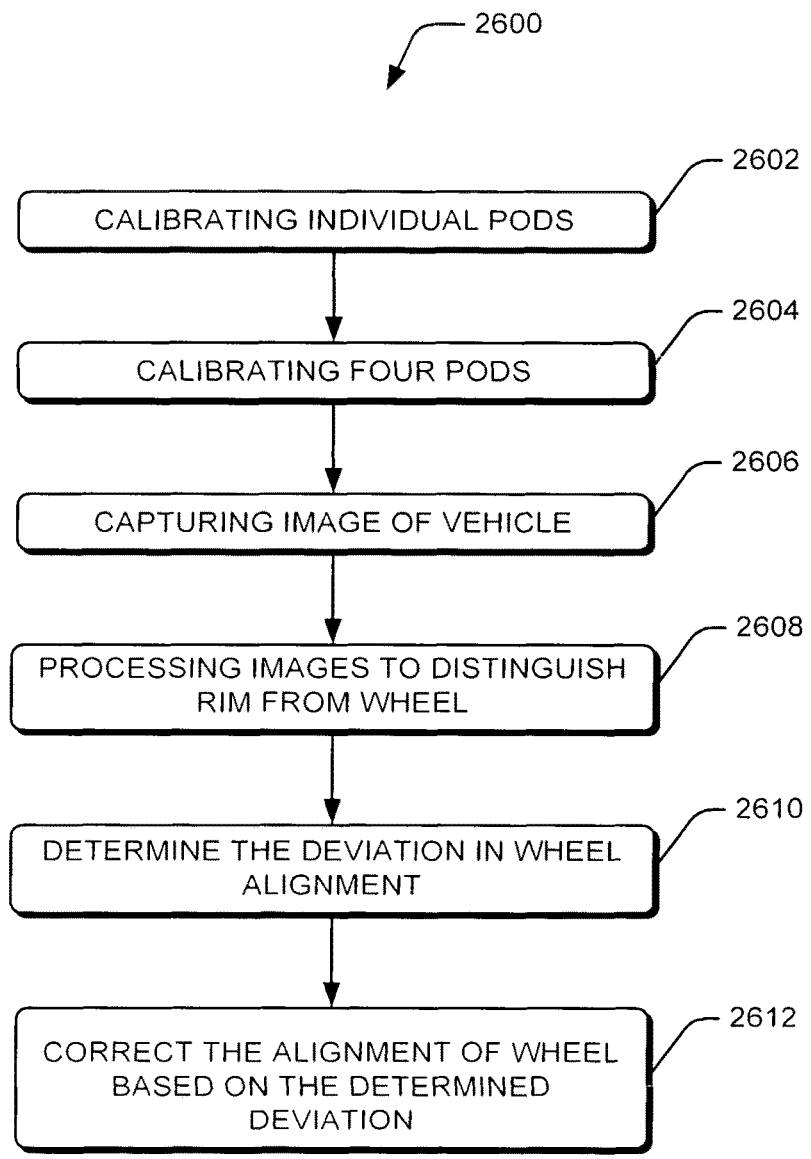
FIG. 26 illustrates a method for wheel alignment, in accordance with an embodiment of the present subject matter.

FIG. 26 illustrates wheel alignment process 2600. Wheel alignment process 2600 begins with calibration of wheel alignment apparatus 100 at block 2602. Block 2602 includes calibrating individual wheel alignment pods 102.

At block 2604, individual calibrated pods 102 are combined to form a form a single reference plane. This process is executed to calibrate the four pod system or wheel alignment apparatus 100.

At block 2606, images of wheel and rims are captured by image capturing device (106). Images collected in previous steps are processed to locate the rim location, find the points of interest. This process is followed by determination of deviation in wheel alignment at block 2608.

At block 2608, wheel alignment system 200 performs various techniques to distinguish the rim from the wheel and obtain rim size and points of interest.

At block 2610, data calculated from block 2608 is utilized to determine the alignment of wheel and its deviation from the ideal wheel alignment.

Finally, at block 2612, data obtained from block 2610 are provided to operator to perform wheel alignment operations.

FIG. 27 illustrates the image capturing and processing process 2700. At block 2702, the process starts with capturing the first image or LED image is captured by illuminating the wheel by means of LED light source 108, keeping laser source OFF 110.

At block 2704, the second image or laser image is captured by projecting a set of lasers on wheel and turning LED light source 108 OFF.

At block 2706, the third image or control image is captured by turning LED light source 108 and laser source 110 OFF.

At block 2708, the set of images captured in previous step are then processed to obtain corrected LED image and corrected image. Process includes application of background subtraction technique on LED image and control image to obtain corrected LED image. At block 2710, same technique is applied on laser image and control image to obtain corrected laser image.

At block 2712, corrected laser image is then processed to calculate initial rim location and dimension. Various techniques are applied like Canny Edge detector technique, Hough transform and various other techniques to obtain initial rim estimate image.

Subsequently, at block 2714, corrected laser image is processed to obtain laser line images. Laser line image is obtained by application of various application techniques such as laplace transform, radon transform and nedler-mead method.

Finally, at block 2716, the initial rim estimate image and laser line image are combined to correct rim size and points of interest.

To test the accuracy of the system, camber and caster measurements are compared for a typical alloy rim (the one shown in 4). This is done using a standard manual camber gauge at various z-angles. A measure of toe is also obtained using a standard surface plate, although it is believed that the accuracy of the system is more accurate than that of the plate and so errors may be misleading.

TABLE 2

Accuracy results for a typical alloy rim.

| Plate z | Code z | Error | Gauge y | Code y | Error | Systematic |
|---|---|---|---|---|---|---|
| 22.5 | 22.6 | 0.1 | 3 | 2.6 | −0.4 | 0.52 |
| 10 | 10.1 | 0.1 | 2 | 0.7 | −1.3 | −0.38 |
| 0 | 1.1 | 1.1 | 1 | −0.7 | −1.7 | −0.78 |
| −10 | −8.7 | 1.3 | −0.4 | −1.4 | −1 | −0.08 |
| −22.5 | −20 | 2.5 | −2.3 | −2.5 | −0.2 | 0.72 |
| ±? | | | ±0.5 | | | |

| Caster Sweep | Gauge | Code |
|---|---|---|
| 22.5 to −22.5 | 5.3 | 5.1 |
| 10 to −10 | 2.4 | 2.1 |

The top-left part of Table 2 shows readings from the ground plate compared to those estimated by the code. Clearly here the code gave very similar results for positive z, but worse for negative z. In certain cases, this can be a limitation of the accuracy of the plate rather than the methodology. However, this does confirm the method is at least as accurate as the gauge on the ground as typically used generally, say in the United Kingdom.

The top-right part of the table shows camber measurements. As before, it clearly shows that the figures are within a degree or so. However, the manual camber gauge itself is rather crude and so it is not clear whether the discrepancies are due to the systematic errors in the camber gauge or our method. Only a complete and thorough investigation by PTM can confirm this. It could be that either the code or the manual gauge has a systematic error of about 0.9 degrees. If this is the case then the right hand column shows corrected values that fall within 1 degree but still short of the target. Of course, it may be that the systematic error is more complicated than a simple addition. Finally, the bottom part of table 2 shows the corresponding caster values.

Further, FIG. 28a to 32b illustrates the results of the wheel rim estimation according to the present subject matter. It is clear from the results that the methodology is successful for the vast majority of cases. This is especially impressive since many of the wheels considered are complicated cases (black, shiny tyre, rusted, etc). Explanations of the failure cases follow:

One of the alloy wheels has a missing POI. This was simply due to the line generator not being in the correct position for testing. To completely overcome this problem, a slightly better laser with wider fan angle should be used. In any case, this should have negligible impact on accuracy of angle measurements where only one or two POIs are missing.

There are a couple of errors on the racing car wheel. This is due to the tyre being shiny and is difficult to overcome. Options for overcoming this issue are: First, assume very few tyres are shiny and use a manual POI selection method (included in the code) for the rare cases of shiny tyres. Second, develop the software to allow a small amount of user input to correct any errors as they happen. Third, develop the software to use the head-on view to aid the methodology at wider angles and last, couple of errors on the black rim would most likely be overcome using a thicker chalk line.

Figure 33:
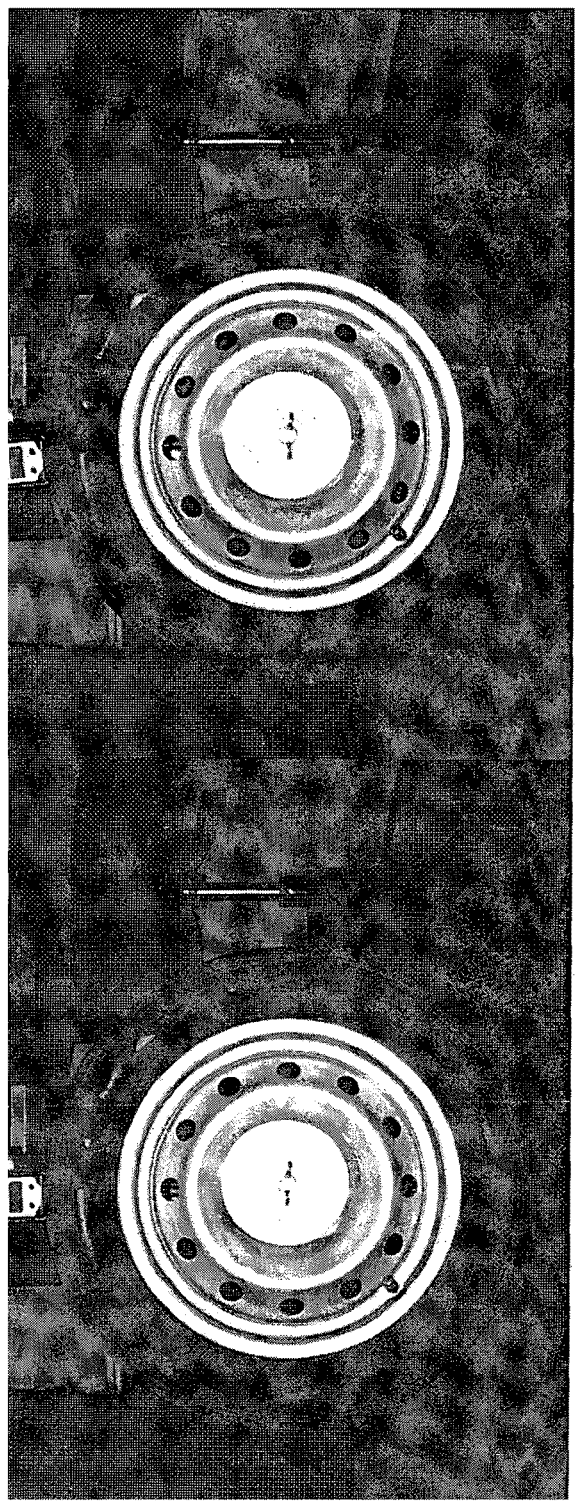
FIG. 33 illustrates images of the wheel captured for determining wheel rotation, in accordance with an embodiment of the present subject matter.

In addition, according to the present subject matter, a rotation of the wheel about its axis can be estimated, as part of determining whether the wheel is aligned or not. For instance, the rotation of the wheel can determined for deriving caster values for the wheel, to facilitate wheel alignment. In an example, a pair of images of the wheel as shown in FIG. 33 are captured using the image capturing device.

To capture test data for determining the rotation of the wheel, the wheel alignment system can include a digital inclinometer which can be placed on top of the tyre for which the estimation is carried out and set to zero. The wheel rim detection technique as described above can then be applied before the wheel is rotated about the axis.

Figure 34:
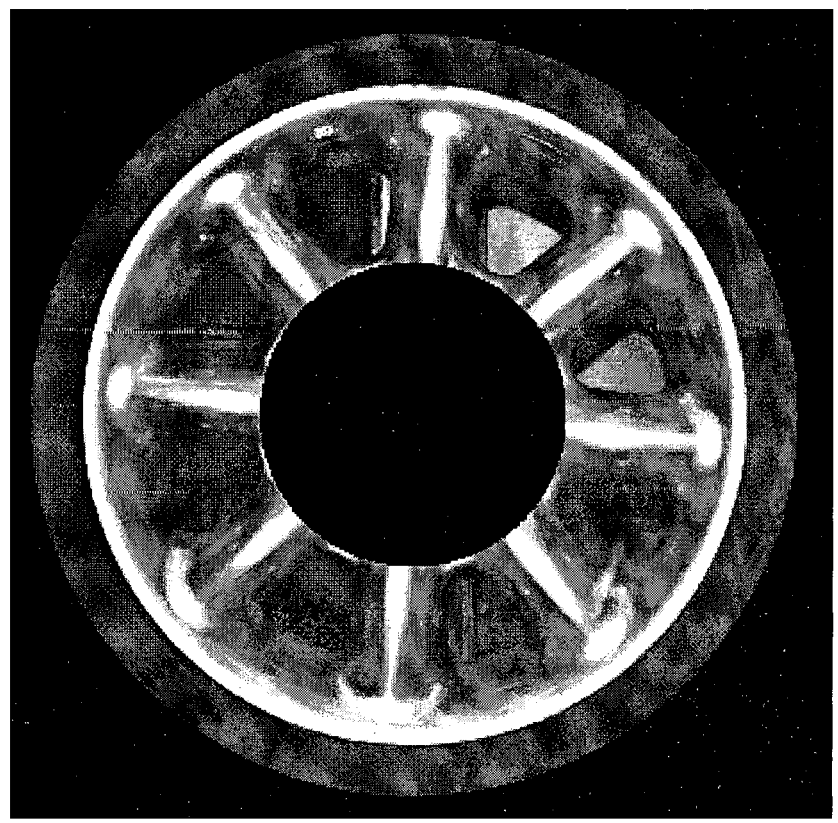
FIG. 34 illustrates a processed image obtained for determining wheel rotation, according to an embodiment of the present subject matter.

In an implementation, to determine the wheel rotation, the wheel can be rotated to two orientations. In one example, the first orientation can correspond to a value close the minimum required measurable difference (0.1°) and the second is a more substantial move (approx. 3°). For determining the wheel rotation, the following information is acquired—three images of the steel wheel as described above, three similar images of an alloy wheel, and images of the alloy wheel at a toe of 5°. In an example, the wheel is head-on with reference to the camera In an implementation, the methodology of determining the wheel rotation is based on image registration between images of the wheel before and after rotation. Since only the wheel is rotating, as opposed to everything else in the image, in one implementation, the moving part of the wheel is separated from the rest of the image. This is achieved using the rim detection method as described above. After the rim has been estimated, the image outside the perimeter of the rim is discarded. An example of this is shown in FIG. 34. As is seen in the figure, a small portion of tyre is left intact. This is an optional step. Also, the centre of the wheel can also be removed, as shown in the figure. In other cases, the centre in may be retained in the images while processing the images for determining wheel rotation.

Further, the next step is to align the cropped version image of the rotated wheel with the full version image of the non-rotated wheel. In an example, one of the various existing registration techniques, such as the Fourier-Mellin method, can be adopted for registration. However, depending on the requirements and specific configuration of the wheel alignment system, other similar techniques may be used.

In said example, using the Fourier-Mellin method, correlations between the two images in the Fourier domain are ascertained to determine scale, rotation, and translation. In one case, it can be assumed that no scaling has occurred between the two images and, although translation is permitted, it is not actually estimated as only the angle is required. In an implementation, a median smoothing using 12 nearest neighbors can be applied to the raw images and a bilinear interpolation is added to attain a certain degree of sub-pixel accuracy. In another case, bi-cubic interpolation can also be used.

The above mentioned methodology was used for two different wheels and three different angles. Experimental results are summarized in table 3. For the first two cases, where the steel and alloy wheels are used when aligned (by eye) to the image capturing device, all but one estimate is accurate to less than 0.1°. The fact that the wheel is only aligned to the image capturing device by eye shows that pinpoint accuracy is not required. However, in certain cases, the method may not work for extreme camber angles where the wheel will be at a large angle to the image plane or where the car is placed in the platform or the rig at a large angle. Suitable modifications can be brought about in the methodology as counter-measures to suit the method for cases mentioned above. As mentioned above, the wheel positioned head on with reference to the image capturing device can return substantially accurate results.

Further, with the above methodology according to the present subject matter, processing time for the alignment is considerably less. For example, the processing time in obtaining the results in this case was just under seven seconds, discounting the time taken for the rim position estimation. Further, the methodology involves use of a square image. Accordingly, the image can be cropped such that the image is square with the centre of the wheel in the centre of the image. Adding such a step has negligible or no effect on the processing time and accuracy or robustness associated with the methodology.

TABLE 3

| (all angles in degrees) | | | | | |
|---|---|---|---|---|---|
| Wheel type | Start angle | End angle | True rotation | Estimate | Error (deg) | Error (%) |
| Steel | 0 | 0.8 | 0.8 | 0.74 | −0.06 | 8% |
| Steel | 0 | 2.9 | 2.9 | 2.78 | −0.12 | 4% |
| Steel | 0.8 | 2.9 | 2.1 | 2.04 | −0.06 | 3% |
| Alloy | 0 | 0.5 | 0.5 | 0.56 | 0.06 | 12% |
| Alloy | 0 | 2.6 | 2.6 | 2.59 | −0.01 | 0% |
| Alloy | 0.5 | 2.6 | 2.1 | 2.04 | −0.06 | 3% |
| | | | | Mean | −0.25 | 30% |
| | | | | Median | −0.06 | 3% |
| | | | | RMS | 0.0694022 | |

TABLE 3-continued (all angles in degrees)

| Wheel type | Start angle | End angle | True rotation | Estimate | Error (deg) | Error (%) |
|---|---|---|---|---|---|---|
| Alloy at 5 degree toe | 0 | 0.6 | 0.6 | 0.56 | −0.04 | |
| Alloy at 5 degree toe | 0 | 3 | 3 | 0 | −3 | |
| Alloy at 5 degree toe | 0.6 | 3 | 2.4 | 2.2 | −0.2 | |

As would be understood from the foregoing description, the above methodology can be used effectively for finding the wheel rotation for where the wheel is facing the image capturing device. Also as mentioned above, the application of the Fourier-Mellin method can be modified and more effective median smoothing techniques can be used for improving overall speed of the methodology. Furthermore, it may be possible to incorporate non-affine transformations to account for wider steering angles.

The present subject matter describes a novel non-contact, laser based wheel alignment system. The wheel alignment system demonstrates the feasibility of non-contact wheel alignment system and offers a major step towards the commercial realization of the wheel alignment system.

Although the subject matter has been described in considerable detail with reference to certain embodiments thereof, other embodiments are possible. It is to be understood that the appended claims are not necessarily limited to the features described herein. Rather, the features are disclosed as embodiments of the wheel alignment system.

We claim:

1. A method for aligning wheels of a vehicle, the method comprising:
    capturing a plurality of images of a wheel of the vehicle;
    identifying, automatically, a rim coupled to the wheel based on the plurality of images;
    aligning the wheel based on the identified rim;
    characterized in that the wheel is stationary at one place and the plurality of images comprises a light emitting diode (LED) image of the wheel, a laser image of the wheel, and a control image of the wheel;
    wherein the LED image comprises an image of the wheel captured using an LED light source, the laser image comprises an image of the wheel captured using a laser source, and the control image comprises an image of the wheel captured using ambient light;
    wherein the identifying comprises:
        obtaining a corrected LED image based on the LED image and the control image and processing the corrected LED image to obtain an initial rim estimate image;
        obtaining a corrected laser image based on the laser image and the control image and processing the corrected laser image to obtain a laser line image; and
        obtaining a rim estimate image based on the initial rim estimate image and the laser line image.

2. The method as recited in claim 1, wherein the method further comprises identifying one or more points of interests in the rim estimate image for aligning the wheel based on the rim.

3. The method as recited in claim 1, wherein obtaining the rim estimate image comprises using the initial rim estimate image as the rim estimate image.

4. The method as recited in claim 1, wherein obtaining the rim estimate image comprises using the laser line image as the rim estimate image.

5. A wheel alignment system, comprising:
    a processor;
    an image pre-processing module coupled to the processor to obtain a plurality of images from an image capturing device, the plurality of images comprising at least a control image of the wheel and a laser image of the wheel;
    a rim estimation module coupled to the processor to automatically identify a rim coupled to the wheel based on the plurality of captured images;
    an alignment module coupled to the processor to align the wheel based on the identified rim;
    wherein the rim estimation module obtains a corrected laser image based on the control image of the wheel and the laser image of the wheel and processes the corrected laser image to obtain a laser line image;
    wherein the rim estimation module obtains an initial rim estimate image and obtains a corrected rim estimate image based on the initial rim estimate image and the laser line image;
    wherein the alignment module processes the corrected rim estimate image for identifying one or more points of interest and determines a deviation of the wheel from a reference by processing the corrected rim estimate image, the laser line image, and the points of interest.

6. The wheel alignment system as recited in claim 5, wherein the alignment module determines one of a center of the rim or at least one point of interest.

7. The wheel alignment system as recited in claim 5, wherein the plurality of images comprises a light emitting diode (LED) image of the wheel, a laser image of the wheel, and a control image of the wheel, wherein the LED image comprises an image of the wheel captured using an LED light source, the laser image comprises an image of the wheel captured using a laser source, and the control image comprises an image of the wheel captured using ambient light.

8. The wheel alignment system as recited in claim 5, wherein the rim estimation module:
    obtains a corrected LED image based on the LED image and the control image; and
    processes the corrected LED image to obtain the initial rim estimate image.

* * * * *